(12) United States Patent
Zhang et al.

(10) Patent No.: US 12,366,777 B2
(45) Date of Patent: Jul. 22, 2025

(54) LIQUID CRYSTAL GRATING AND DRIVING METHOD THEREFOR, AND 3D DISPLAY DEVICE

(71) Applicants: Hefei BOE Display Technology Co., Ltd., Anhui (CN); BOE Technology Group Co., Ltd., Beijing (CN)

(72) Inventors: Yonggang Zhang, Beijing (CN); Wei Zhang, Beijing (CN); Chao Li, Beijing (CN); Xipeng Wang, Beijing (CN); Jilei Gao, Beijing (CN); Xin Zhou, Beijing (CN); Benzhi Xu, Beijing (CN); Qi Liu, Beijing (CN); Liangwei Zhang, Beijing (CN); Xing Zhang, Beijing (CN)

(73) Assignees: Hefei BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/024,013

(22) PCT Filed: Apr. 26, 2022

(86) PCT No.: PCT/CN2022/089370
§ 371 (c)(1),
(2) Date: Feb. 28, 2023

(87) PCT Pub. No.: WO2023/206091
PCT Pub. Date: Nov. 2, 2023

(65) Prior Publication Data
US 2024/0280862 A1   Aug. 22, 2024

(51) Int. Cl.
G02F 1/1343   (2006.01)
G02F 1/13357   (2006.01)
(Continued)

(52) U.S. Cl.
CPC .. *G02F 1/134327* (2013.01); *G02F 1/133603* (2013.01); *H04N 13/32* (2018.05); *H04N 13/359* (2018.05); *H04N 13/383* (2018.05)

(58) Field of Classification Search
CPC ......... G02F 1/134327; G02F 1/133603; G02F 1/1335; G02F 1/1343; G02F 1/134309;
(Continued)

(56) References Cited

U.S. PATENT DOCUMENTS 9,274,356 B2 *  3/2016  Kim ................. H04N 13/366
10,168,541 B2 *  1/2019  Ochiai ................ G02B 30/27
(Continued)

FOREIGN PATENT DOCUMENTS

CN   101458412 A   6/2009
CN   102929048 A   2/2013
(Continued)

*Primary Examiner* — Kevin Quarterman
(74) *Attorney, Agent, or Firm* — IPro, PLLC

(57) ABSTRACT

The present disclosure provides a liquid crystal grating and a driving method therefor, and a three-dimensional (3D) display device. The liquid crystal grating includes: a first substrate; a second substrate, where the second substrate and the first substrate are oppositely arranged; a liquid crystal layer, where the liquid crystal layer is located between the first substrate and the second substrate; and a first transparent grating electrode layer located at a side, facing the liquid crystal layer, of the first substrate; where the first transparent grating electrode layer includes a plurality of first strip-shaped electrodes extending in a first direction and arranged at intervals in a second direction, and each of at least part of the first strip-shaped electrodes is divided in the first direction into at least two first strip-shaped sub-electrodes arranged independently.

18 Claims, 12 Drawing Sheets

(51) Int. Cl.
*H04N 13/32* (2018.01)
*H04N 13/359* (2018.01)
*H04N 13/383* (2018.01)

(58) Field of Classification Search
CPC .... H04N 13/32; H04N 13/359; H04N 13/383; G02B 30/33
See application file for complete search history.

(56) References Cited

U.S. PATENT DOCUMENTS

| | | |
|---|---|---|
| 2009/0002267 A1* | 1/2009 | Nam ................ G02B 30/27 345/6 |
| 2009/0153653 A1 | 6/2009 | Lee et al. |
| 2017/0048516 A1 | 2/2017 | Yang et al. |
| 2019/0335163 A1 | 10/2019 | Yang et al. |

FOREIGN PATENT DOCUMENTS

| | | |
|---|---|---|
| CN | 203054398 U | 7/2013 |
| CN | 203433240 U | 2/2014 |
| CN | 104730719 B | 3/2017 |
| CN | 206057761 U | 3/2017 |
| CN | 206863433 U | 1/2018 |
| CN | 108572489 A | 9/2018 |
| JP | H0915564 A | 1/1997 |

\* cited by examiner

LIQUID CRYSTAL GRATING AND DRIVING METHOD THEREFOR, AND 3D DISPLAY DEVICE

CROSS-REFERENCE TO RELATED APPLICATIONS

The disclosure is a National Stage of International Application No. PCT/CN2022/089370, filed on Apr. 26, 2022, which is hereby incorporated by reference in their entireties.

FIELD

The present disclosure relates to the technical field of 3D display, in particular to a liquid crystal grating and a driving method therefor, and a 3D display device.

BACKGROUND

A working principle of three-dimensional (3D) display technology is as follows: when the left eye and the right eye of a viewer separately receive images of the same scene, a horizontal distance (that is, a pupil distance about 65 mm) between the two eyes of the viewer generates a subtle difference between viewing angles of the two eyes; and accordingly, a minor difference, which is called "binocular parallax", between the images observed by the left eye and the right eye of the viewer separately will be generated and fused by the cerebral visual cortex, thereby exhibiting a stereoscopic effect.

As the display technology develops, naked-eye 3D display has become popular. The naked-eye 3D technology refers to a display technology allowing the left eye and the right eye to directly view pictures with parallax from a display screen without any tools, and transmitting the two pictures to the brain, so as to generate a stereoscopic picture.

SUMMARY

The embodiments of the present disclosure provide a liquid crystal grating and a driving method therefor, and a 3D display device. Particular solutions are as follows.

A liquid crystal grating provided in an embodiment of the present disclosure includes:
a first substrate;
a second substrate, where the second substrate and the first substrate are oppositely arranged;
a liquid crystal layer, where the liquid crystal layer is located between the first substrate and the second substrate; and
a first transparent grating electrode layer located at a side, facing the liquid crystal layer, of the first substrate:
where the first transparent grating electrode layer includes a plurality of first strip-shaped electrodes extending in a first direction and arranged at intervals in a second direction, and
each of at least part of the first strip-shaped electrodes is divided in the first direction into at least two first strip-shaped sub-electrodes arranged independently.

In a possible implementation mode, according to the liquid crystal grating provided in the embodiment of the present disclosure, each of the first strip-shaped electrodes is divided in the first direction into at least two first strip-shaped sub-electrodes arranged independently.

In a possible implementation mode, the liquid crystal grating provided in the embodiment of the present disclosure further includes: an insulating layer located at a side, facing the liquid crystal layer, of the first transparent grating electrode layer; and a second transparent grating electrode layer located at a side, facing the liquid crystal layer, of the insulating layer:
where the second transparent grating electrode layer includes a plurality of second strip-shaped electrodes extending in the first direction and arranged at intervals in the second direction, and orthographic projections of the second strip-shaped electrodes on the first substrate cover an orthographic projection of a region between two first adjacent strip-shaped electrodes on the first substrate; and
each of at least part of the second strip-shaped electrodes is divided in the first direction into at least two second strip-shaped sub-electrodes arranged independently.

In a possible implementation mode, according to the liquid crystal grating provided in the embodiment of the present disclosure, each of the second strip-shaped electrodes is divided in the first direction into at least two second strip-shaped sub-electrodes arranged independently.

In a possible implementation mode, according to the liquid crystal grating provided in the embodiment of the present disclosure, the number of the second strip-shaped sub-electrodes of each of the second strip-shaped electrodes is equal to that of the first strip-shaped sub-electrodes of each of the first strip-shaped electrodes.

In a possible implementation mode, according to the liquid crystal grating provided in the embodiment of the present disclosure, the first strip-shaped sub-electrodes of the first strip-shaped electrodes have the same length in the first direction, and the second strip-shaped sub-electrodes of the second strip-shaped electrodes have the same length in the first direction.

In a possible implementation mode, the liquid crystal grating provided in the embodiment of the present disclosure includes a grating region and a peripheral region arranged around the grating region:
where the grating region includes: a plurality of control lines extending in the first direction and arranged in the second direction, a plurality of signal input lines extending in the second direction and arranged in the first direction, and a plurality of drive transistors located between the first substrate and the first transparent grating electrode layer;
the drive transistors are in one-to-one correspondence with the first strip-shaped sub-electrodes and the second strip-shaped sub-electrodes;
the control lines are arranged on the same layer as gates of the drive transistors, and the signal input lines are arranged on the same layer as sources and drains of the drive transistors; and
the gates of the drive transistors are electrically connected to the control lines, the sources of the drive transistors are electrically connected to the signal input lines, and the drains of the drive transistors are electrically connected to the first strip-shaped sub-electrodes or the second strip-shaped sub-electrodes.

In a possible implementation mode, according to the liquid crystal grating provided in the embodiment of the present disclosure, the control lines include first control lines and second control lines, the signal input lines include first signal input lines and second signal input lines, and the drive transistors include first drive transistors and second drive transistors:
gates of the first drive transistors are electrically connected to the first control lines, sources of the first drive transistors are electrically connected to the first signal input lines, and drains of the first drive transistors are electrically connected to the first strip-shaped sub-electrodes; and gates of the second drive transistors are electrically connected to the second control lines, sources of the second drive transistors are electrically connected to the second signal input lines, and drains of the second drive transistors are electrically connected to the second strip-shaped sub-electrodes.

In a possible implementation mode, according to the liquid crystal grating provided in the embodiment of the present disclosure, the gates of the first drive transistors electrically connected to the same first strip-shaped electrode are electrically connected to the same first control line, and one first control line is electrically connected to the gates of the first drive transistors electrically connected to at least one first strip-shaped electrode.

In a possible implementation mode, according to the liquid crystal grating provided in the embodiment of the present disclosure, the gates of the second drive transistors electrically connected to the same second strip-shaped electrode are electrically connected to the same second control line, and one second control line is electrically connected to the gates of the second drive transistors electrically connected to at least one second strip-shaped electrode.

In a possible implementation mode, according to the liquid crystal grating provided in the embodiment of the present disclosure, the peripheral region includes a plurality of first signal leads and a plurality of second signal leads: the sources of the first drive transistors electrically connected to the same first strip-shaped electrode are electrically connected to the same first signal lead through the corresponding first signal input lines, and the sources of the first drive transistors electrically connected to different first strip-shaped electrodes are electrically connected to different first signal leads through the corresponding first signal input lines; and the sources of the second drive transistors electrically connected to the same second strip-shaped electrode are electrically connected to the same second signal lead through the corresponding second signal input lines, and the sources of the second drive transistors electrically connected to different second strip-shaped electrodes are electrically connected to different second signal leads through the corresponding second signal input lines.

In a possible implementation mode, according to the liquid crystal grating provided in the embodiment of the present disclosure, the peripheral region includes a plurality of first signal leads and a plurality of second signal leads: the sources of the first drive transistors electrically connected to the first strip-shaped sub-electrodes of the same first strip-shaped electrode are electrically connected to different first signal leads through the corresponding first signal input lines, and the sources of the first drive transistors electrically connected to different first strip-shaped electrodes are electrically connected to different first signal leads through the corresponding first signal input lines; and the sources of the second drive transistors electrically connected to the second strip-shaped sub-electrodes of the same second strip-shaped electrode are electrically connected to different second signal leads through the corresponding second signal input lines, and the sources of the second drive transistors electrically connected to different second strip-shaped electrodes are electrically connected to different second signal leads through the corresponding second signal input lines.

In a possible implementation mode, according to the liquid crystal grating provided in the embodiment of the present disclosure, the grating region is divided into at least one region; and for each region, the first strip-shaped electrodes are divided into a plurality of first groups, the number of the first strip-shaped electrodes in each of the first groups is the same, and the number of the first signal leads is equal to that of the first strip-shaped electrodes in each of the first groups: the second strip-shaped electrodes are divided into a plurality of second groups, the number of the second strip-shaped electrodes in each of the second groups is the same, and the number of the second signal leads is equal to that of the second strip-shaped electrodes in each of the second groups:

in the first groups, the first strip-shaped electrodes at the same position are electrically connected to the same first signal lead through the same first signal input line, and the first strip-shaped electrodes at different positions are electrically connected to different first signal leads through different first signal input lines; and in the second groups, the second strip-shaped electrodes at the same position are electrically connected to the same second signal lead through the same second signal input line, and the second strip-shaped electrodes at different positions are electrically connected to different second signal leads through different second signal input lines.

In a possible implementation mode, the liquid crystal grating provided in the embodiment of the present disclosure further includes a planarization layer located between the drive transistors and the first transparent grating electrode layer: where each first drive transistor includes a first gate, a first active layer, a first source and a first drain that are arranged in a stack manner; and the first strip-shaped sub-electrodes are electrically connected to the first drains through via holes penetrating the planarization layer:

each second drive transistor includes a second gate, a second active layer, a second source and a second drain that are arranged in a stack manner; and the second strip-shaped sub-electrodes are electrically connected to the second drains through via holes penetrating the planarization layer and the insulating layer; and the first gate is arranged on a same layer as the second gate, the first active layer is arranged on a same layer as the second active layer, and the first source and the first drain are arranged on a same layer as the second source and the second drain.

In a possible implementation mode, according to the liquid crystal grating provided in the embodiment of the present disclosure, the first signal leads are arranged on the same layer as the first gate, and the second signal leads are arranged on the same layer as the second gate.

In a possible implementation mode, the liquid crystal grating provided in the embodiment of the present disclosure further includes a gate insulating layer located between the first gate and the first active layer: where the first signal lead is electrically connected to the first signal input line through a via hole penetrating the gate insulating layer, and the second signal lead is electrically connected to the second signal input line through a via hole penetrating the gate insulating layer.

In a possible implementation mode, the liquid crystal grating provided in the embodiment of the present disclosure further includes a common electrode layer at a side, facing the liquid crystal layer, of the second substrate: where the common electrode layer is a planar structure arranged on an entire surface.

Correspondingly: an embodiment of the present disclosure further provides a driving method for the liquid crystal grating provided by any one of the embodiments of the present disclosure. The driving method includes:

in a two-dimensional (2D) display mode, driving the liquid crystal grating all to form a light-transmitting region; and in a 3D display mode, driving the liquid crystal grating to form light-transmitting regions and dark-state regions that are arranged alternately.

In a possible implementation mode, according to the driving method provided in the embodiment of the present disclosure, in the 3D display mode, the driving the liquid crystal grating to form the light-transmitting regions and the dark-state regions that are arranged alternately specifically includes:

obtaining current position information of a left eye or a right eye of a viewer with respect to each light-transmitting area of the liquid crystal grating; and controlling drive transistors at positions of the current position information to be turned off through corresponding control lines according to the determined current position information, to form the light-transmitting regions; and controlling drive transistors at remaining positions to be turned on, applying a drive voltage to corresponding signal input lines through first signal leads and second signal leads, and transmitting the drive voltage to the first strip-shaped electrodes and the second strip-shaped electrodes through the turned-on drive transistors, to form the dark-state regions.

Correspondingly, an embodiment of the present disclosure further provides a 3D display device. The 3D display device includes a display panel, the liquid crystal grating provided by any one of the embodiments of the present disclosure, and a human eye tracking module:

the human eye tracking module is configured to obtain positions where eyes of a viewer are located; and according to the current positions, where the eyes of the viewer are located, obtained by the human eye tracking module, the liquid crystal grating is controlled to form light-transmitting regions and dark-state regions that are arranged alternately, so that a left eye of the viewer sees a left-eye image displayed in the display panel through the light-transmitting regions of the liquid crystal grating, and a right eye sees a right-eye image displayed in the display panel through the light-transmitting regions.

In a possible implementation mode, according to the 3D display device provided in the embodiment of the present disclosure, the display panel is a liquid crystal display panel, and the liquid crystal grating is arranged at a light incident side of the liquid crystal display panel: or the display panel is an organic light emitting diode (OLED) display panel, and the liquid crystal grating is arranged at a light emitting side of the OLED display panel.

BRIEF DESCRIPTION OF THE DRAWINGS

In order to explain the technical solutions in embodiments of the present disclosure more clearly; the accompanying drawings required in the description of the embodiments will be described below briefly. Apparently, the accompanying drawings in the following description show merely some embodiments of the present disclosure, and other drawings can be derived from these accompanying drawings by those of ordinary skill in the art without creative efforts.

DETAILED DESCRIPTION OF THE EMBODIMENTS

Figure 1:
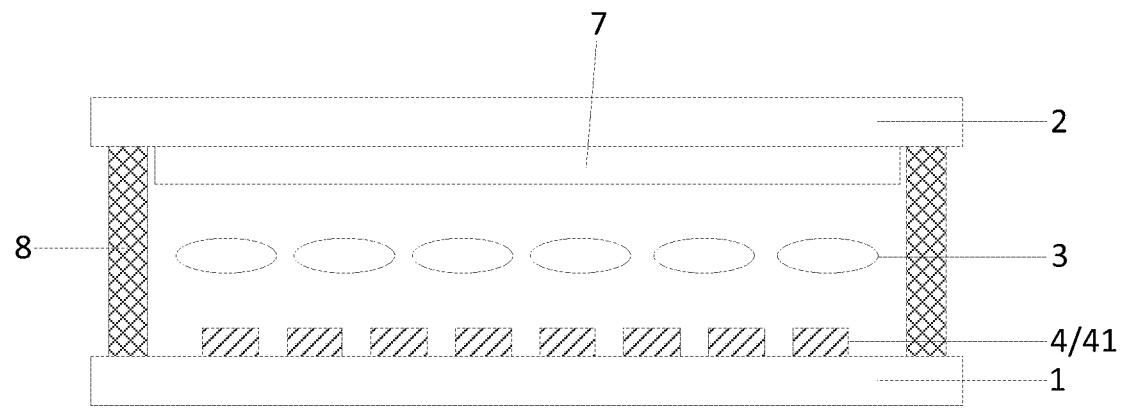
FIG. 1 is a schematic structural diagram of a liquid crystal grating according to an embodiment of the present disclosure.

In order to make the objectives, technical solutions, and advantages in the embodiments of the present disclosure clearer, the technical solutions in the embodiments of the present disclosure will be clearly and completely described below with reference to the accompanying drawings in the embodiments of the present disclosure. It is obvious that the described embodiments are some embodiments rather than all embodiments of the present disclosure. Moreover, the embodiments of the present disclosure and features in the embodiments can be combined with one another without conflict. Based on the described embodiments of the present disclosure, all other embodiments acquired by those skilled in the art without making creative efforts fall within the scope of protection of the present disclosure.

Unless otherwise defined, technical or scientific terms used in the present disclosure should have ordinary meaning as understood by those of ordinary skill in the art to which the present disclosure belongs. "First", "second" and similar words used in the present disclosure do not mean any order, quantity or importance, but are only used for distinguishing different components. "Comprise", "include" and similar words are intended to mean that an element or item in front of the word encompasses elements or items that are listed behind the word and equivalents thereof, but do not exclude other elements or items. "Connect", "connected" and similar words are not limited to a physical or mechanical connection, but can include an electrical connection, whether direct or indirect.

It should be noted that sizes and shapes of all figures in the accompanying drawings do not reflect true scales, and are merely intended to illustrate contents of the present disclosure. Moreover, the same or similar reference numerals denote the same or similar elements or elements having the same or similar functions throughout.

Figure 2:
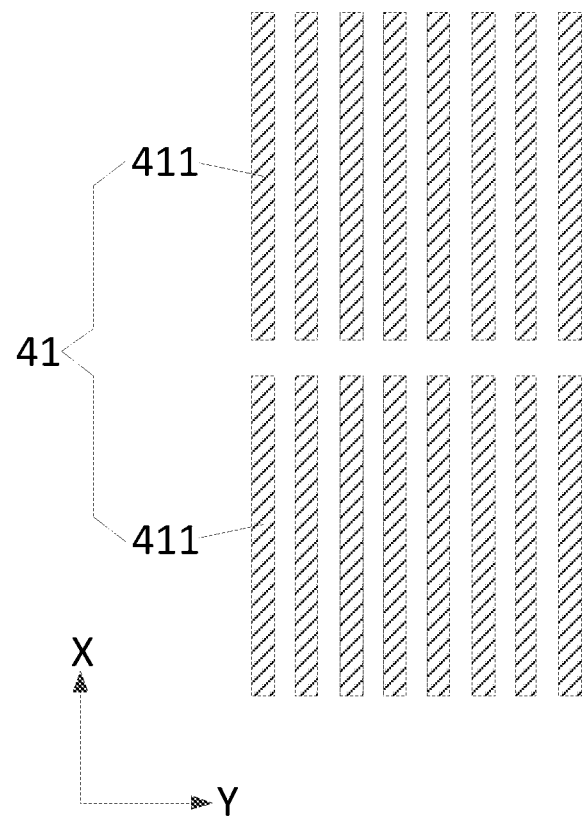
FIG. 2 is a schematic plane view of a first transparent grating electrode layer of FIG. 1.
Figure 3:
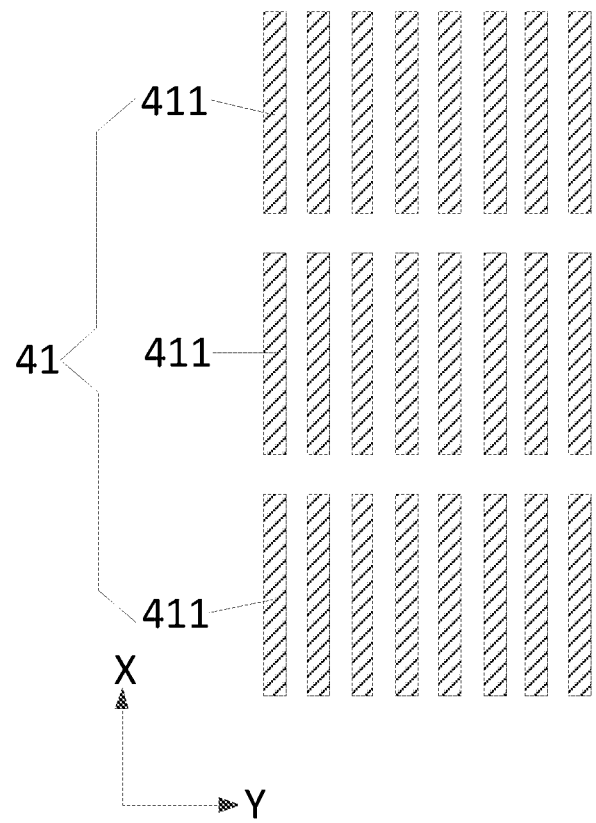
FIG. 3 is another schematic plane view of a first transparent grating electrode layer of FIG. 1.

Embodiments of the present disclosure provide a liquid crystal grating. As shown in FIGS. 1-3, of which FIG. 1 is a schematic sectional view of the liquid crystal grating. FIG. 2 is a schematic plane view of a first transparent grating electrode layer of FIG. 1 and FIG. 3 is another schematic plane view of the first transparent grating electrode layer of FIG. 1; and the liquid crystal grating includes:

a first substrate 1;
a second substrate 2, where the second substrate 2 and the first substrate 1 are oppositely arranged;
a liquid crystal layer 3, where the liquid crystal layer 3 is located between the first substrate 1 and the second substrate 2; and
a first transparent grating electrode layer 4 located at a side, facing the liquid crystal layer 3, of the first substrate 1: where the first transparent grating electrode layer 4 includes a plurality of first strip-shaped electrodes 41 extending in a first direction X and arranged at intervals in a second direction Y; and
at least part of the first strip-shaped electrodes 41 are divided in the first direction X into at least two first strip-shaped sub-electrodes 411 arranged independently. For example, as shown in FIG. 2, each of the first strip-shaped electrodes 41 is divided in the first direction X into two first strip-shaped sub-electrodes 411 arranged independently. As shown in FIG. 3, each of the first strip-shaped electrodes 41 is divided in the first direction X into three first strip-shaped sub-electrodes 411 arranged independently, which is not limitative apparently.

When the liquid crystal grating provided in the embodiments of the present disclosure is applied to a 3D display device, by applying a drive voltage to part of the first strip-shaped electrodes 41 in the first transparent grating electrode layer 4 and applying no drive voltage to part of the first strip-shaped electrodes 41, the liquid crystal grating may be driven to form light-transmitting regions and dark-state regions that are arranged alternately, so that a left eye of a viewer may see a left-eye image displayed in a display panel via the light-transmitting regions of the liquid crystal grating, and a right eye may see a right-eye image displayed in the display panel via the light-transmitting regions, so as to achieve naked-eye 3D display. By dividing each of at least part of the first strip-shaped electrodes 41 in the first direction X into at least two first strip-shaped sub-electrodes 411 arranged independently, resistances of the first strip-shaped electrodes 41 each divided into at least two first strip-shaped sub-electrodes 411 arranged independently may be reduced, to reduce signal attenuation and delay: so as to improve a performance of the liquid crystal grating.

It is to be noted that the liquid crystal grating provided in the embodiments of the present disclosure is particularly suitable for a large-size 3D display device, such as a 3D display screen in a movie theater. The large-size 3D display device needs a large-size liquid crystal grating correspondingly, so that each first strip-shaped electrode of the first transparent grating electrode layer is long and has a large resistance, which is likely to cause signal attenuation and delay. Therefore, by dividing each long first strip-shaped electrode into at least two first strip-shaped sub-electrodes in the disclosure, the resistances of the first stripe-shaped electrodes may be greatly reduced, so as to improve signal transmission performance. Certainly, the liquid crystal grating provided in the embodiments of the present disclosure is also suitable for a small-size 3D display device.

It is to be noted that FIGS. 1-3 illustrate only some of the first strip-shaped electrodes 41 according to the embodiments of the present disclosure. Certainly, the number of the first strip-shaped electrodes 41 is set according to a size of the liquid crystal grating during particular implementation.

During particular implementation, according to the liquid crystal grating provided in the embodiments of the present disclosure, as shown in FIGS. 2 and 3, each of the first strip-shaped electrodes 41 is divided in the first direction X into at least two first strip-shaped sub-electrodes 411 arranged independently. In this way, the resistance of each of the first strip-shaped electrodes 41 in the entire liquid crystal grating may be reduced, so that the signal transmission performance of each of the first strip-shaped electrodes 41 in the entire liquid crystal grating may be improved.

Figure 4:
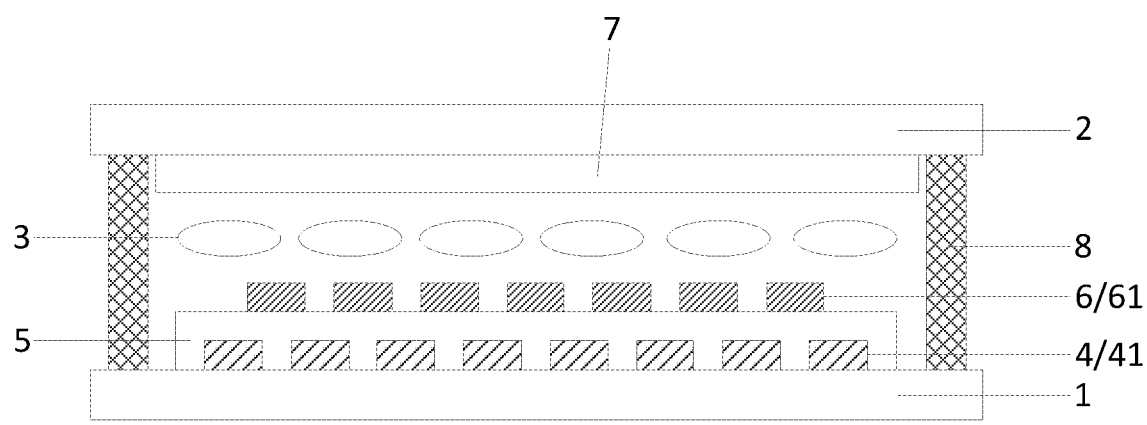
FIG. 4 is a schematic structural diagram of another liquid crystal grating according to an embodiment of the present disclosure.
Figure 5:
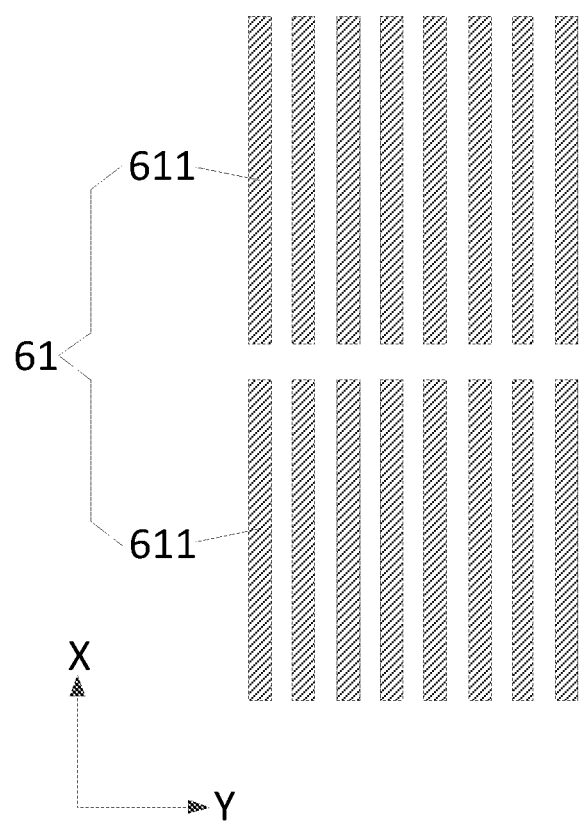
FIG. 5 is a schematic plane view of a second transparent grating electrode layer of FIG. 4.
Figure 6:
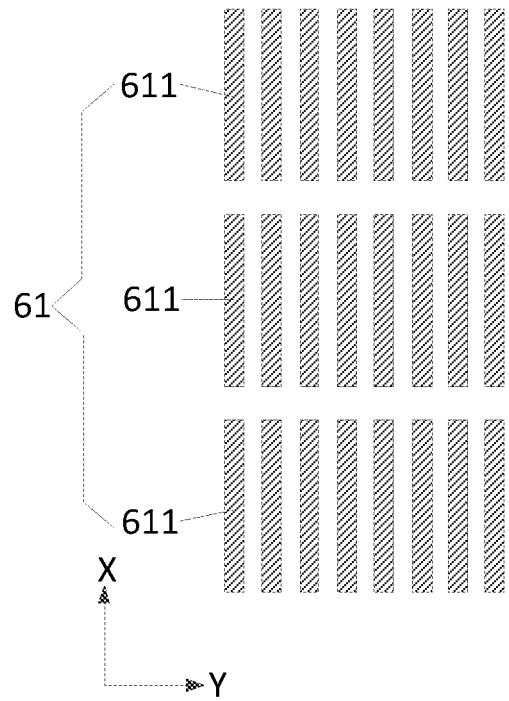
FIG. 6 is another schematic plane view of a second transparent grating electrode layer of FIG. 4.

During particular implementation, as for a single-layer transparent grating electrode layer, since there is a gap between the strip-shaped electrodes, a state of liquid crystal molecules at the gap cannot be regulated, thus the liquid crystal molecules at the gap are only in one state, and the gap can only be a light-transmitting region or a dark-state region and cannot form a switchable light-transmitting region or dark-state region. In order to make every position in the liquid crystal grating adjustable as a light-transmitting region or a dark-state region, in the liquid crystal grating provided in the embodiments of the present disclosure, as shown in FIGS. 4-6, of which FIG. 4 is another schematic sectional view of the liquid crystal grating. FIG. 5 is a schematic plane view of a second transparent grating electrode layer in FIG. 4, and FIG. 6 is another schematic plane view of the second transparent grating electrode layer in FIG. 4; and the liquid crystal grating further includes: an insulating layer 5 located at a side, facing the liquid crystal layer 3, of the first transparent grating electrode layer 4, and a second transparent grating electrode layer 6 located at a side, facing the liquid crystal layer 3, of the insulating layer 5:

the second transparent grating electrode layer 6 includes a plurality of second strip-shaped electrodes 61 extending in the first direction X and arranged at intervals in the second direction Y. and orthographic projections of the second strip-shaped electrodes 61 on the first substrate 1 cover an orthographic projection of a region between two first adjacent strip-shaped electrodes 41 on the first substrate 1; and
each of at least part of the second strip-shaped electrodes 61 is divided in the first direction X into at least two second strip-shaped sub-electrodes 611 arranged independently. For example, as shown in FIG. 5, each of the second strip-shaped electrodes 61 is divided in the first direction X into two second strip-shaped sub-electrodes 611 arranged independently. As shown in FIG. 6, each of the second strip-shaped electrodes 61 is divided in the first direction X into three second strip-shaped sub-electrodes 611 arranged independently, which is not limitative apparently.

By dividing at least part of the second strip-shaped electrodes 61 in the first direction X into at least two second strip-shaped sub-electrodes 611 arranged independently, a resistance of each of the second strip-shaped electrodes 61 divided into at least two second strip-shaped sub-electrodes 611 arranged independently may be reduced, so as to further reduce signal attenuation and delay on the basis of realizing that each position in the liquid crystal grating may be regulated as a light-transmitting region or a dark-state region, and further to improve the performance of the liquid crystal grating.

During particular implementation, according to the liquid crystal grating provided in the embodiments of the present disclosure, as shown in FIGS. 5 and 6, each of the second strip-shaped electrodes 61 is divided in the first direction X into at least two second strip-shaped sub-electrodes 611 arranged independently. In this way, the resistance of each of the second strip-shaped electrodes 61 in the entire liquid crystal grating may be reduced, so that the signal transmission performance of each of the second strip-shaped electrodes 61 in the entire liquid crystal grating may be improved.

During particular implementation, according to the liquid crystal grating provided in the embodiments of the present disclosure, as shown in FIGS. 1-6, the first strip-shaped sub-electrodes 411 are equidistantly distributed in the second direction Y. and the second strip-shaped sub-electrodes 611 are equidistantly distributed in the second direction Y.

During particular implementation, according to the liquid crystal grating provided in the embodiments of the present disclosure, as shown in FIGS. 2, 3, 5 and 6, the number of the second strip-shaped sub-electrodes 611 of each of the second strip-shaped electrodes 61 is equal to that of the first strip-shaped sub-electrodes 411 of each of the first strip-shaped electrodes 41.

During particular implementation, according to the liquid crystal grating provided in the embodiments of the present disclosure, as shown in FIGS. 2, 3, 5 and 6, the first strip-shaped sub-electrodes 411 of the first strip-shaped electrodes 41 have the same length in the first direction X. and the second strip-shaped sub-electrodes 611 of the second strip-shaped electrodes 61 have the same length in the first direction X.

During particular implementation, according to the liquid crystal grating provided in the embodiments of the present disclosure, as shown in FIGS. 1 and 4, the liquid crystal grating further includes a common electrode layer 7 located at a side, facing the liquid crystal layer 3, of the second substrate 2: where the common electrode layer 7 may be a planar structure arranged on an entire surface. Specifically, a drive voltage is applied to the first transparent grating electrode layer 4, the second transparent grating electrode layer 6 and the common electrode layer 7, so that the liquid crystal grating forms light-transmitting regions and dark-state regions that are arranged alternately.

During particular implementation, according to the liquid crystal grating provided in the embodiments of the present disclosure, as shown in FIGS. 1 and 4, the liquid crystal grating further includes a sealant layer 8 located between the first substrate 1 and the second substrate 2 and located around the liquid crystal grating, where the sealant layer 8 is used for sealing the liquid crystal layer 3.

Figure 7:
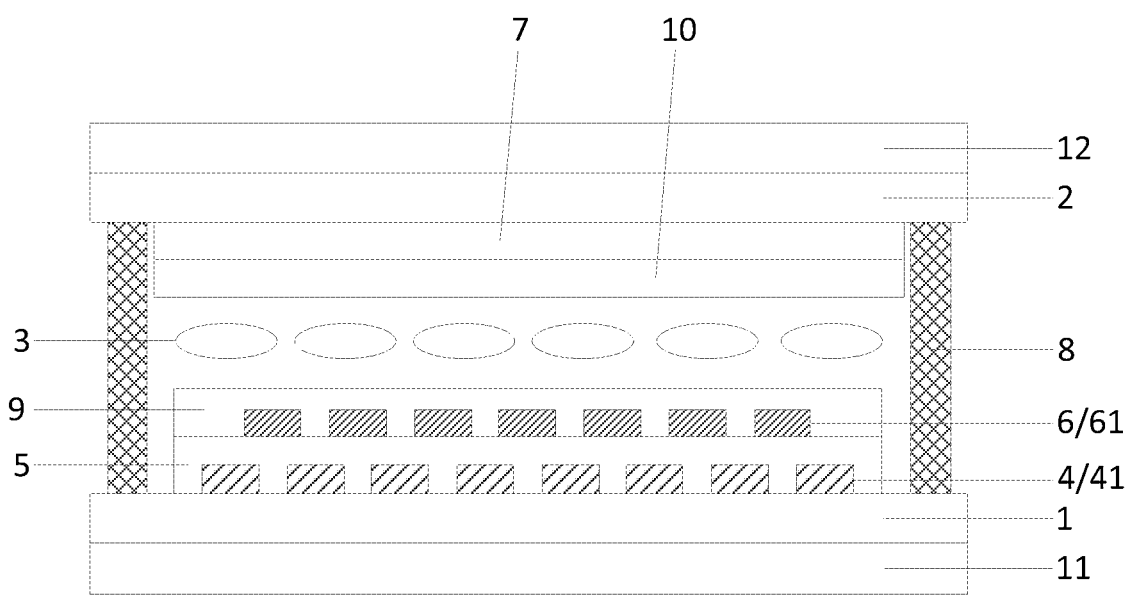
FIG. 7 is a schematic structural diagram of another liquid crystal grating according to an embodiment of the present disclosure.

During particular implementations, as shown in FIG. 7, the liquid crystal grating provided in the embodiments of the present disclosure further includes: a first alignment layer 9 located between the second transparent grating electrode layer 6 and the liquid crystal layer 3: a second alignment layer 10 located between the liquid crystal layer 3 and the common electrode layer 7: a first polarizer 11 located at a side, facing away from the second substrate 2, of the first substrate 1; and a second polarizer 12 located at a side, facing away from the first substrate 1, of the second substrate.

During particular implementations, the first polarizer 11 is attached to the first substrate 1 through optical clear adhesive, and the second polarizer 12 is attached to the second substrate 2 through optical clear adhesive.

During particular implementation, as shown in FIG. 7, the liquid crystal molecules in the liquid crystal layer 3 may be aligned through the first alignment layer and the second alignment layer 10, such that the liquid crystal molecules are in a twisted nematic (TN) arrangement, that is, the liquid crystal grating provided in the embodiments of the present disclosure may be a TN-type liquid crystal grating. In the liquid crystal layer of the TN-type liquid crystal grating, in an unpowered state, the liquid crystal molecules are continuously twisted by 90° between the first substrate 1 and the second substrate 2; and when the first transparent grating electrode layer 4 and the second transparent grating electrode layer 6 are both loaded with a drive voltage, the liquid crystal molecules are deflected, and long axes of the liquid crystal molecules are arranged perpendicular to the first substrate.

During particular implementation, as shown in FIG. 7, for the TN-type liquid crystal grating, a direction of a light-transmitting axis of the first polarizer 11 and a direction of a light-transmitting axis of the second polarizer 12 are perpendicular to each other, and incident light is converted by the first polarizer 11 into linearly polarized light is emitted into the liquid crystal layer 3. For a region of the first transparent grating electrode layer 4 and the second transparent grating electrode layer 6 without a drive signal applied, the liquid crystal molecules in the liquid crystal layer 3 are not deflected, a polarization direction of the linearly polarized light rotates by 90° after the linearly polarized light passes through the liquid crystal layer 3, and the linearly polarized light may pass through the second polarizer 12, so that the region where the liquid crystal molecules are not deflected corresponds to a light-transmitting region. For a region of the first transparent grating electrode layer 4 and the second transparent grating electrode layer 6 with a drive signal applied, the liquid crystal molecules in the liquid crystal layer 3 are deflected, the polarization direction of the linearly polarized light does not change after the linearly polarized light passes through the liquid crystal layer 3, and the linearly polarized light may not pass through the second polarizer 12, so that the region where the liquid crystal molecules are deflected corresponds to a dark-state region.

It is to be noted that the liquid crystal grating provided in the embodiments of the disclosure is described by taking a TN-type liquid crystal grating as an example, which is not limitative apparently.

Figure 8:
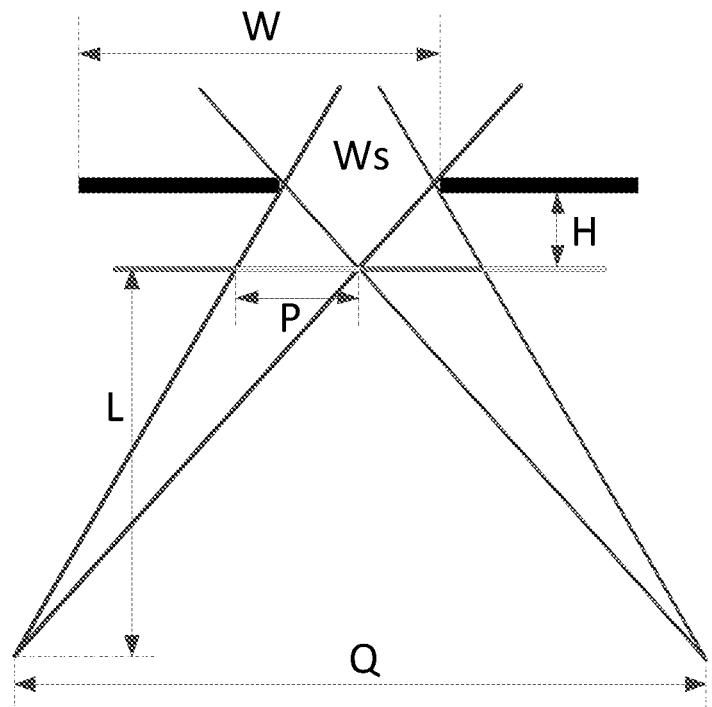
FIG. 8 is an optical path diagram of a liquid crystal grating applied to a 3D display device according to an embodiment of the present disclosure.

As shown in FIG. 8, FIG. 8 is an optical path diagram of a liquid crystal grating applied to a 3D display device (the liquid crystal grating is attached to a 2D display panel) according to embodiments of the present disclosure. According to the optical path diagram, the following formulas may be obtained from a similar triangle theorem:

$$\frac{H}{H+L} = \frac{P}{Q}$$

$$\frac{L}{H+L} = \frac{P}{Ws}$$

$$\frac{L}{H+L} = \frac{KP}{W}.$$

Where W is a grating period (pitch), Ws is a grating slit width, H is a grating placement height, K is a viewpoint number, P is a pixel width of a display panel, L is an optimal viewing distance of a viewer, D is a pupil interval, and a viewpoint interval Q=D/N, and N is a positive integer.

Main parameters of the grating obtained by combining the above formulas are as follows:

$$H = \frac{LP}{Q-P}$$

$$Ws = \frac{QP}{Q-P}$$

$$W = \frac{KQP}{Q-P} = KWs.$$

Generally, once the placement height H of the grating is determined, the display panel and the grating cannot be changed after being attached to each other; and furthermore, when the display panel is determined, the pixel width P is also a constant value. It can be obtained from the above formulas:

$$L = \frac{H(Q-P)}{P} = \frac{HP}{Ws-P}.$$

It can be seen that when H and P are constant, the optimal viewing distance L is adjusted by changing the grating slit width Ws: moreover. Since W=KWs, the viewpoint number K may also be adjusted by changing the grating slit width Ws, for example, the larger the viewpoint number K is, the more viewers can view images simultaneously.

Figure 9:
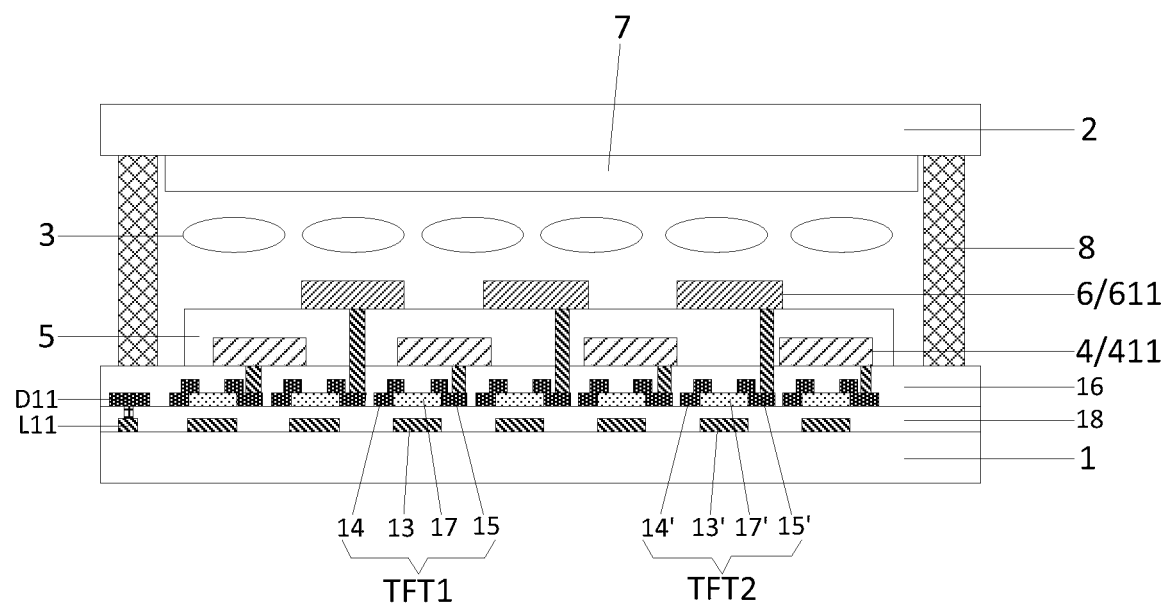
FIG. 9 is a schematic structural diagram of another liquid crystal grating according to an embodiment of the present disclosure.
Figure 10:
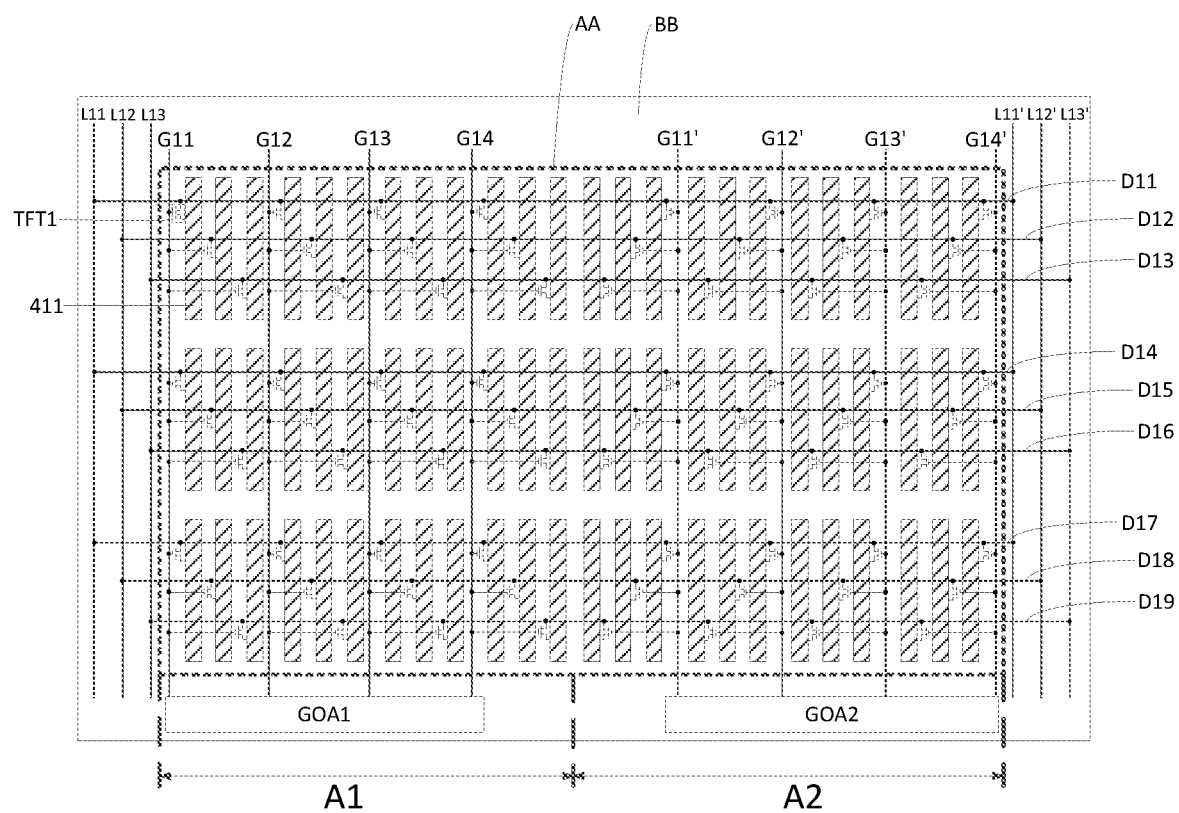
FIG. 10 is a schematic diagram of a plane structure of a liquid crystal grating according to an embodiment of the present disclosure.
Figure 11:
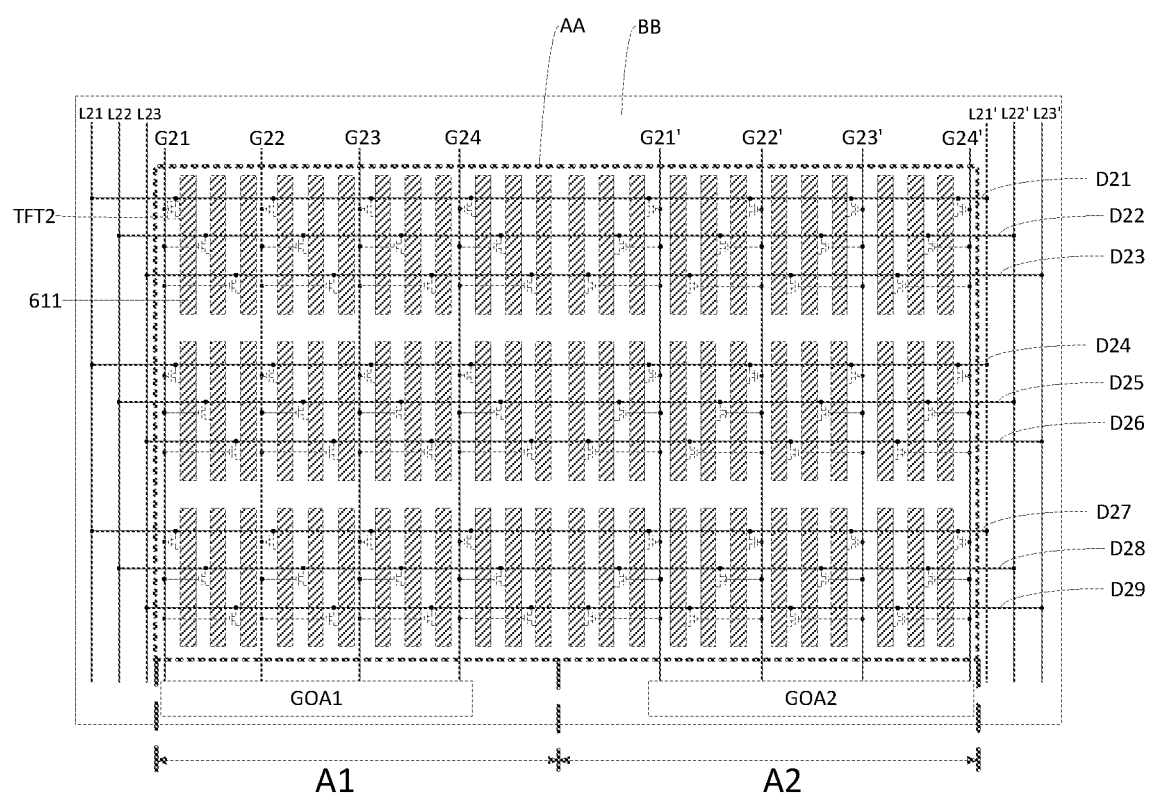
FIG. 11 is a schematic diagram of a plane structure of another liquid crystal grating according to an embodiment of the present disclosure.
Figure 12:
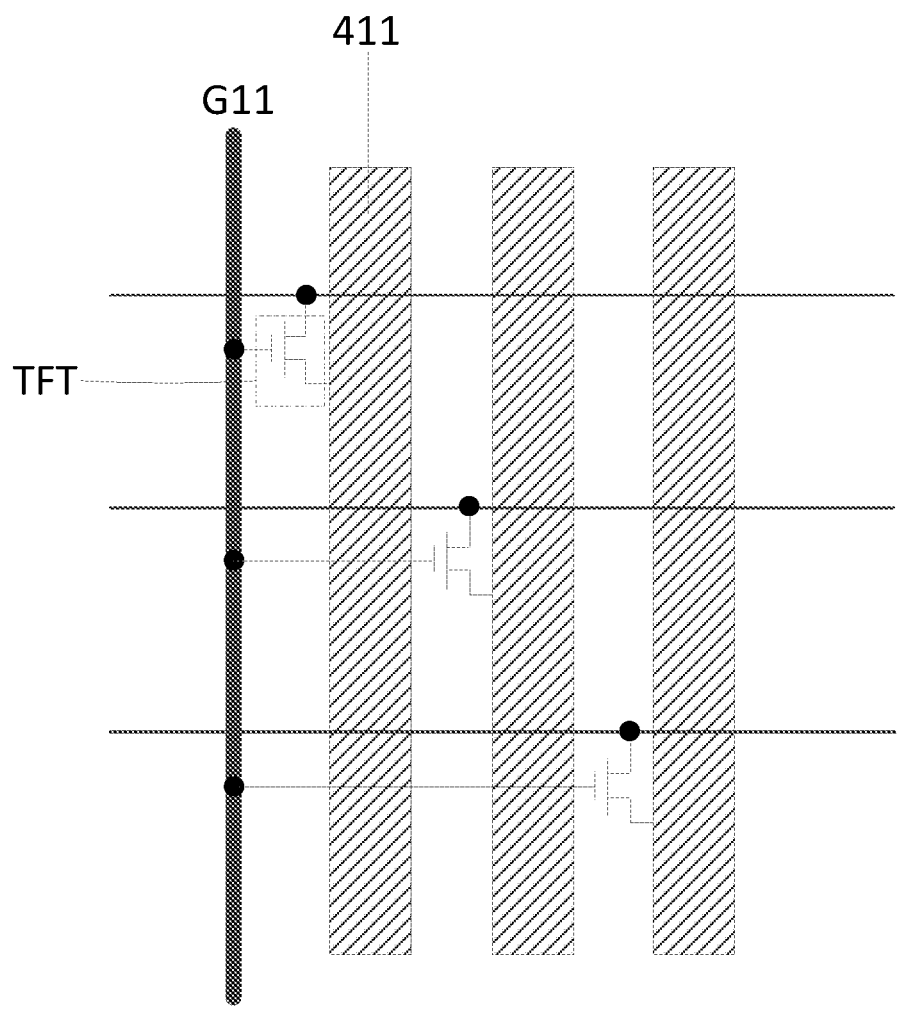
FIG. 12 is a schematic partially-enlarged diagram of FIG. 10.

During particular implementation, according to the liquid crystal grating provided in the embodiments of the present disclosure, as shown in FIGS. 9-12, of which FIG. 9 is another schematic section view of the liquid crystal grating. FIGS. 10 and 11 are two schematic plane view of the liquid crystal grating, and FIG. 12 is a schematic partially-enlarged diagram of FIG. 10; and the liquid crystal grating has a grating region AA and a peripheral region BB arranged around the grating region AA.

The grating region AA includes: a plurality of control lines (G11, G12, . . . . G11', G12' . . . ) (G21, G22, . . . G21', G22', . . . ) extending in the first direction X and arranged in the second direction Y, a plurality of signal input lines (D11, D12, . . . ) (D21, D22, . . . ) extending in the second direction Y and arranged in the first direction X, and a plurality of drive transistors (TFT1 and TFT2) located between the first substrate 1 and the first transparent grating electrode layer 4. The drive transistors (TFT1 and TFT2) are in one-to-one correspondence with the first strip-shaped sub-electrodes 411 and the second strip-shaped sub-electrodes 611.

The control lines (G11, G12, . . . . G11', G12' . . . ) (G21, G22, . . . . G21', G22', . . . ) are arranged on the same layer as gates (13, 13') of the drive transistors (TFT1, TFT2), and the signal input lines (D11, D12, . . . ) (D21, D22, . . . ) are arranged on the same layer as sources (14, 14') and drains (15, 15') of the drive transistors (TFT1, TFT2).

The gates (13, 13') of the drive transistors (TFT1 and TFT2) are electrically connected to the control lines, the sources (14, 14') of the drive transistors (TFT1, TFT2) are electrically connected to the signal input lines, and the drains (15, 15') of the drive transistors (TFT1, TFT2) are electrically connected to the first strip-shaped sub-electrodes 411 or the second strip-shaped sub-electrodes 611.

It is to be noted that FIG. 10 of the embodiment of the present disclosure is a schematic plane view of the first transparent grating electrode layer 4 and the corresponding control lines (G11, G12, . . . . G11', G12' . . . ), signal input lines (D11, D12, . . . ), TFT1 and first signal leads (L11, L12, . . . . L11', L12', described later); and FIG. 11 is a schematic plane view of the second transparent grating electrode layer 6 and the corresponding control lines (G21, G22 . . . . G21'. G22' . . . ), signal input lines (D21. D22 . . . ). TFT2 and second signal leads (L21. L22 . . . . L21'. L22' . . . described later).

During particular implementation, according to the liquid crystal grating provided in the embodiments of the present disclosure, as shown in FIGS. 9-11, the TFT is controlled to be conducted or disconnected by the G. and a D signal is charged or discharged by the TFT.

The embodiments of the present disclosure controls switching of each of the first strip-shaped sub-electrodes 411 and the second strip-shaped sub-electrodes 611 by using the drive transistors (TFT1. TFT2), that is, each of the first strip-shaped sub-electrodes 411 and the second strip-shaped sub-electrodes 611 may be controlled individually by a corresponding TFT to switch between transmitting light and transmitting no light. In this way, positions where eyes of a viewer are located may be obtained in real time in cooperation with a human eye tracking module, and a drive module controls the switching of the drive transistors corresponding to the current positions according to the current positions where the eyes of the viewer are located obtained by the human eye tracking module. Therefore, the liquid crystal grating forms light-transmitting regions and dark-state regions that are arranged alternately, the left eye of the viewer may see a left-eye image displayed in a display panel through the light-transmitting regions of the liquid crystal grating, and the right eye may see a right-eye image displayed in the display panel through the light-transmitting regions, so the light-transmitting regions and the dark-state regions may be precisely controlled, such that a motion parallax due to the movement of the viewer in the 3D display may be achieved, moiré patterns and view crosstalk caused by a viewing position change may further be eliminated. Furthermore, when the position of the viewer changes, the positions of the human eyes are tracked by the human eye tracking module; through individual switching control of the TFTs corresponding to the first strip-shaped sub-electrodes 411 and the second strip-shaped sub-electrodes 611, the opening and position of the grating are adjusted in real time; and the slit width Ws of the liquid crystal grating may be precisely controlled, so as to adjust the optimal viewing distance L and the viewpoint number K of the viewer by changing the slit width Ws of the grating, thereby providing an optimal viewing experience.

During particular implementation, according to the liquid crystal grating provided in the embodiments of the present disclosure, as shown in FIGS. 9-11, the control lines include first control lines (G11. G12 . . . . G11'. G12' . . . ) and second control lines (G21. G22 . . . . G21'. G22' . . . ), the signal input lines include first signal input lines (D11. D12 . . . ) and second signal input lines (D21. D22 . . . ), and the drive transistors include first drive transistors TFT1 and second drive transistors TFT2.

Gates (13, 13') of the first drive transistors TFT1 are electrically connected to the corresponding first control lines (G11. G12 . . . . G11'. G12' . . . ), sources (14, 14') of the first drive transistors TFT1 are electrically connected to the corresponding first signal input lines (D11. D12 . . . ), and drains (15, 15') of the first drive transistors TFT1 are electrically connected to the corresponding first strip-shaped sub-electrodes 411.

Gates (13, 13') of the second drive transistors TFT2 are electrically connected to the corresponding second control lines (G21. G22 . . . . G21'. G22 . . . ), sources (14, 14') of the second drive transistors TFT2 are electrically connected to the corresponding second signal input lines (D21. D22 . . . ), and drains (15, 15') of the second drive transistors TFT2 are electrically connected to the corresponding second strip-shaped sub-electrodes 611.

Specifically, as shown in FIGS. 9 and 10, gates 13 of the first drive transistors TFT1 are electrically connected to the corresponding first control lines (G11. G12 . . . . G11'. G12' . . . ), sources 14 of the first drive transistors TFT1 are electrically connected to the corresponding first signal input lines (D11. D12 . . . ), and drains 15 of the first drive transistors TFT1 are electrically connected to the corresponding first strip-shaped sub-electrodes 411.

Specifically, as shown in FIGS. 9 and 11, gates 13' of the second drive transistors TFT2 are electrically connected to the corresponding second control lines (G21. G22 . . . . G21. G22' . . . ), sources 14' of the second drive transistors TFT2 are electrically connected to the corresponding second signal input lines (D21. D22 . . . ), and drains 15' of the second drive transistors TFT2 are electrically connected to the corresponding second strip-shaped sub-electrodes 611.

During particular implementation, according to the liquid crystal grating provided in the embodiments of the present disclosure, the gates of the first drive transistors electrically connected to the same first strip-shaped electrode are electrically connected to the same first control line. Specifically, as shown in FIG. 10, the gates of the first drive transistors TFT1 electrically connected to the three first strip-shaped sub-electrodes 411 of the 1st first strip-shaped electrode 41 from the left are electrically connected to the first control line G11, the gates of the first drive transistors TFT1 electrically connected to the three first strip-shaped sub-electrodes 411 of the 2nd first strip-shaped electrode 41 from the left are electrically connected to the first control line G11, and the gates of the first drive transistors TFT1 electrically connected to the three first strip-shaped sub-electrodes 411 of the 3rd first strip-shaped electrode 41 from the left are electrically connected to the first control line G11; the gates of the first drive transistors TFT1 electrically connected to the three first strip-shaped sub-electrodes 411 of the 4th first strip-shaped electrode 41 from the left are electrically connected to the first control line G12, the gates of the first drive transistors TFT1 electrically connected to the three first strip-shaped sub-electrodes 411 of the 5th first strip-shaped electrode 41 from the left are electrically connected to the first control line G12, and the gates of the first drive transistors TFT1 electrically connected to the three first strip-shaped sub-electrodes 411 of the 6th first strip-shaped electrode 41 from the left are electrically connected to the first control line G12; and so on.

During particular implementation, according to the liquid crystal grating provided in the embodiments of the present disclosure, one first control line is electrically connected to the gates of the first drive transistors electrically connected to at least one first strip-shaped electrode. Specifically, as shown in FIG. 10, the first control line G11 is electrically connected to the gates of the first drive transistors TFT1 electrically connected to the first strip-shaped sub-electrodes 411 of the 1st to 3rd first strip-shaped electrodes 41 from the left: the first control line G12 is electrically connected to the gates of the first drive transistors TFT1 electrically connected to the first strip-shaped sub-electrodes 411 of the 4th to 6th first strip-shaped electrodes 41 from the left: the first control line G13 is electrically connected to the gates of the first drive transistors TFT1 electrically connected to the first strip-shaped sub-electrodes 411 of the 7th to 9th first strip-shaped electrodes 41 from the left; and so on.

In the embodiments of the present disclosure, one first control line is electrically connected to the gates of the first drive transistors electrically connected to at least one (for example, three) first strip-shaped electrode, so as to reduce the number of control lines and increase the transmission rate.

It is to be noted that in the embodiments of the present disclosure, one first control line is electrically connected to the gates of the first drive transistors electrically connected to the three first strip-shaped electrodes. Certainly, during particular implementation, one first control line may be electrically connected to the gates of the first drive transistors electrically connected to one, two or more first strip-shaped electrodes. The load of the first control line may not meet the requirements under the condition of more than three strip-shaped electrodes. Under the condition that one first control line is only electrically connected to the gates of the first drive transistors electrically connected to one first strip-shaped electrode, the number of first control lines is too large. Thus, the embodiments of the present disclosure preferably use one first control line to be electrically connected to the gates of the first drive transistors electrically connected two or three first strip-shaped electrodes.

During particular implementation, according to the liquid crystal grating provided in the embodiments of the present disclosure, as shown in FIGS. 9 and 11, the gates of the second drive transistors TFT2 electrically connected to the same second strip-shaped electrode 61 are electrically connected to the same second control line, and one second control line is electrically connected to the gates of the second drive transistors TFT2 electrically connected to at least one second strip-shaped electrode 61. Specifically, a connection relationship of the second strip-shaped sub-electrodes 611 of the second strip-shaped electrode 61 in FIG. 11 may be described with reference to FIG. 10, and the connection relationship in FIG. 11 is the same as that in FIG. 10 and will not be repeated herein. Moreover, the embodiments of the present disclosure preferably use one second control line to be electrically connected to the gates of the second drive transistors electrically connected two or three second strip-shaped electrodes.

During particular implementation, according to the liquid crystal grating provided in the embodiments of the present disclosure, as shown in FIGS. 10 and 11, the peripheral region BB includes a plurality of first signal leads (L11. L12 . . . . L11'. L12' . . . ) and a plurality of second signal leads (L21. L22 . . . . L21'. L22' . . . ).

Specifically, as shown in FIG. 10, the sources of the first drive transistors TFT1 electrically connected to the same first strip-shaped electrode (for example, the 1st first strip-shaped electrode 41 from the left) are electrically connected to the same first signal lead L11 through corresponding first signal input lines (D11. D14. D17), and the sources of the first drive transistors TFT1 electrically connected to different first strip-shaped electrodes (for example, the 1st first strip-shaped electrode 41 and the 2nd first strip-shaped electrode 41 from the left) are electrically connected to different first signal leads (L11, L12) through corresponding first signal input lines (D11. D12).

Specifically, as shown in FIG. 11, the sources of the second drive transistors TFT2 electrically connected to the same second strip-shaped electrode (for example, the 1st second strip-shaped electrode 61 from the left) are electrically connected to the same second signal lead L11' through the corresponding second signal input lines (D21. D24. D27), and the sources of the second drive transistors TFT2 electrically connected to different second strip-shaped electrodes (for example, the 1st second strip-shaped electrode 61 and the 2nd second strip-shaped electrode 61 from the left) are electrically connected to different second signal leads (L11'. L12') through the corresponding second signal input lines (D21. D22).

The structures shown in FIGS. 10 and 11 provided in the embodiments of the present disclosure take an example that the first strip-shaped sub-electrodes of the same first strip-shaped electrode are electrically connected to the same first signal lead, that is, a drive voltage or no drive voltage is applied to the first strip-shaped sub-electrodes of the same first strip-shaped electrode simultaneously, and an example that the second strip-shaped sub-electrodes of the same second strip-shaped electrode are electrically connected to the same second signal lead, that is, the drive voltage or no drive voltage is applied to the second strip-shaped sub-electrodes of the same second strip-shaped electrodes simultaneously. FIGS. 10 and 11 may implement column driving of a column or some columns. Certainly, during particular implementation, the sources of the first drive transistors electrically connected to the first strip-shaped sub-electrodes of the same first strip-shaped electrode are electrically connected to different first signal leads through the corresponding first signal input lines, and the sources of the first drive transistors electrically connected to different first strip-shaped electrodes are electrically connected to different first signal leads through the corresponding first signal input lines, that is, all the first strip-shaped electrodes are loaded with the drive voltage by using different first signal leads respectively. The sources of the second drive transistors electrically connected to the second strip-shaped sub-electrodes of the same second strip-shaped electrode are electrically connected to different second signal leads through the corresponding second signal input lines, and the sources of the second drive transistors electrically connected to different second strip-shaped electrodes are electrically connected to different second signal leads through the corresponding second signal input lines, that is, all the second strip-shaped electrodes are loaded the drive voltage by using different second signal leads respectively. In this way, partitioned driving may be implemented to achieve detailed control over the light-transmitting regions and dark-state regions of the grating.

Specifically, the structural schematic diagrams of the first transparent grating electrode layer and the second transparent grating electrode layer using partition driving are substantially the same as that in FIGS. 10 and 11, except that all the first strip-shaped sub-electrodes in the partitioned driving are electrically connected to different first signal leads separately, and all the second strip-shaped sub-electrodes are electrically connected to different second signal leads separately.

During particular implementation, according to the liquid crystal grating provided in the embodiments of the present disclosure, as shown in FIGS. 10 and 11, the grating region AA is divided into at least one region (for example, two regions A1 and A2 along a center of AA), for each region (for example, the first region A1), the first strip-shaped electrodes 41 are divided into a plurality of first groups (for example, every three strip-shaped electrodes from the left are divided into one group), the number of the first strip-shaped electrodes 41 in each of the first groups is the same (for example, each group includes three first strip-shaped electrodes 41), and the number of the first signal leads (L11, L12 . . . ) is equal to the number of the first strip-shaped electrodes 41 in each of the first groups (the number of the first signal leads is three): the second strip-shaped electrodes 61 are divided into a plurality of second groups (for example, each group includes three second strip-shaped electrodes 61), the number of the second strip-shaped electrodes 61 in each of the second groups is the same (for example, each group includes three second strip-shaped electrodes 61), and the number of the second signal leads (L21, L22 . . . ) is equal to the number of the second strip-shaped electrodes 61 in each of the second groups (the number of the second signal leads is three).

Specifically, as shown in FIG. 10, in the first groups, the first strip-shaped electrodes at the same position are electrically connected to the same first signal lead through the same first signal input line, for example, the 1st first strip-shaped electrode 41, the 4th first strip-shaped electrode 41, the 7th first strip-shaped electrode 41, from the left are all electrically connected to the first signal lead L11 through the first signal input line D11: the 2nd first strip-shaped electrode 41, the 5th first strip-shaped electrode 41, the 8th first strip-shaped electrode 41, from the left are all electrically connected to the first signal lead L12 through the first signal input line D12; and the 3rd first strip-shaped electrode 41, the 6th first strip-shaped electrode 41, the 9th first strip-shaped electrode 41 . . . from the left are all electrically connected to the first signal lead L13 through the first signal input line D13, and so on. The first strip-shaped electrodes at different positions are electrically connected to different first signal leads through different first signal input lines, for example, the 1st first strip-shaped electrode 41, the 2nd first strip-shaped electrode 41 and the 3rd first strip-shaped electrode 41 from the left are electrically connected to the corresponding first signal leads L11, L12, L13 respectively through the first signal input lines D11. D12. D13; and the 4th first strip-shaped electrode 41, the 5th first strip-shaped electrode 41 and the 6th first strip-shaped electrode 41 from the left are electrically connected to the corresponding first signal leads L1/. L12. L13 respectively through the first signal input lines D11. D12. D13, and so on.

Specifically, as shown in FIG. 11, in each of the second groups, the second strip-shaped electrodes at the same position are electrically connected to the same second signal lead through the same second signal input line, for example, the 1st second strip-shaped electrode 61, the 4th second strip-shaped electrode 61, the 7th second strip-shaped electrode 61, from the left are all electrically connected to the second signal lead L21 through the second signal input line D21; the 2nd second strip-shaped electrode 61, the 5th second strip-shaped electrode 61, the 8th second strip-shaped electrode 61, from the left are all electrically connected to the second signal lead L22 through the second signal input line D22; and the 3rd second strip-shaped electrode 61, the 6th second strip-shaped electrode 61, the 9th second strip-shaped electrode 61, . . . , from the left are all electrically connected to the second signal lead L23 through the second signal input line D23, and so on. The second strip-shaped electrodes at different positions are electrically connected to different second signal leads through different second signal input lines, for example, the 1st second strip-shaped electrode 61, the 2nd second strip-shaped electrode 61 and the 3rd second strip-shaped electrode 61 from the left are electrically connected to the corresponding second signal leads L21. L22. L23 respectively through the second signal input lines D21. D22. D23; and the 4th second strip-shaped electrode 61, the 5th second strip-shaped electrode 61 and the 6th second strip-shaped electrode 61 from the left are electrically connected to the corresponding second signal leads L21. L22. L23 respectively through the second signal input lines D21. D22. D23, and so on.

Specifically, as shown in FIG. 10, the first control lines (G11, G12 . . . ) located in the first region A1 are electrically connected to a gate drive circuit GOAL respectively, and the first control lines (G11'. G12' . . . ) located in the second region A2 are electrically connected to a gate drive circuit GOA2 respectively, that is, the first control lines (G11, G12 . . . . G11'. G12' . . . ) are controlled by two GOA units to be opened row by row in a certain timing sequence.

Specifically, as shown in FIG. 11, the second control lines (G21. G22 . . . ) located in the first region A1 are electrically connected to the gate drive circuit GOAL respectively, and the second control lines (G21'. G22' . . . ) located in the second region A2 are electrically connected to the gate drive circuit GOA2 respectively, that is, the second control lines (G21. G22 . . . . G21'. G22" . . . ) are controlled by two GOA units to be opened row by row in a certain timing sequence.

During particular implementation, according to the liquid crystal grating provided in the embodiments of the present disclosure, as shown in FIG. 9, the liquid crystal grating further includes a planarization layer 16 located between the drive transistors (TFT1. TFT2) and the first transparent grating electrode layer 4: each first drive transistor TFT1 includes a first gate 13, a first active layer 17, a first source 14 and a first drain 15 that are arranged in a stack manner; and the first strip-shaped sub-electrodes 411 are electrically connected to the first drains 15 through via holes penetrating the planarization layer 16.

Each second drive transistor TFT2 includes a second gate 13', a second active layer 17', a second source 14' and a second drain 15' that are arranged in a stack manner; and the second strip-shaped sub-electrodes 611 are electrically connected to the second drains 15' through via holes penetrating the planarization layer 16 and the insulating layer 5.

The first gates 13 are arranged on the same layer as the second gates 13', the first active layers 17 are arranged on the same layer as the second active layers 17', and the first sources 14 and the first drains 15 are arranged on the same layer as the second sources 14 and the second drains 15'. Such the film layers having the same function may be manufactured by using a single patterning process, to reduce a manufacturing process and save a manufacturing cost.

During particular implementation, according to the liquid crystal grating provided in the embodiments of the present disclosure, as shown in FIGS. 9-11, the first signal leads (L11. L12 . . . ) are arranged on the same layer as the first gates 13, and the second signal leads (L21. L22 . . . ) are arranged on the same layer as the second gates 13'. In this way, it is only necessary to change an original pattern when forming the first gates 13 and the second gates 13', that is, the patterns of the first signal leads (L11, L12 . . . ), the second signal leads (L21, L22 . . . ), the first gates 13 and the second gates 13' may be formed by a single patterning process without adding a separate process for preparing the first signal leads (L11, L12 . . . ) and the second signal leads (L21, L22 . . . ), so as to simplify a preparation process flow, save the production cost and improve the production efficiency.

Figure 13:
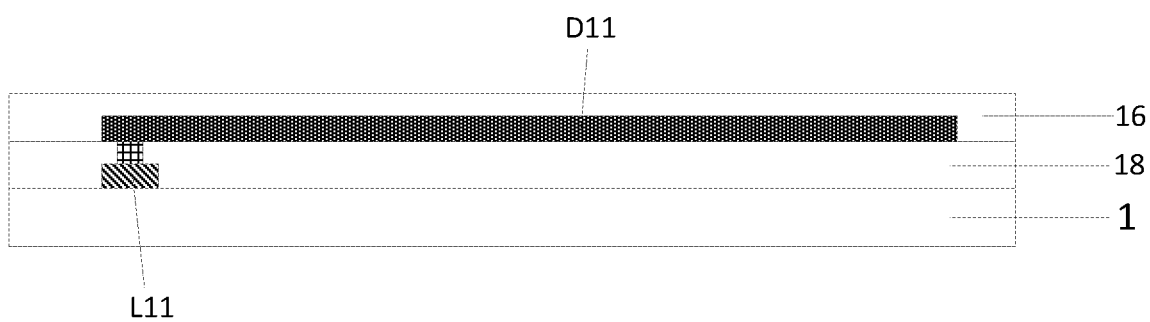
FIG. 13 is a schematic partial diagram of film layers of FIG. 9.
Figure 14:
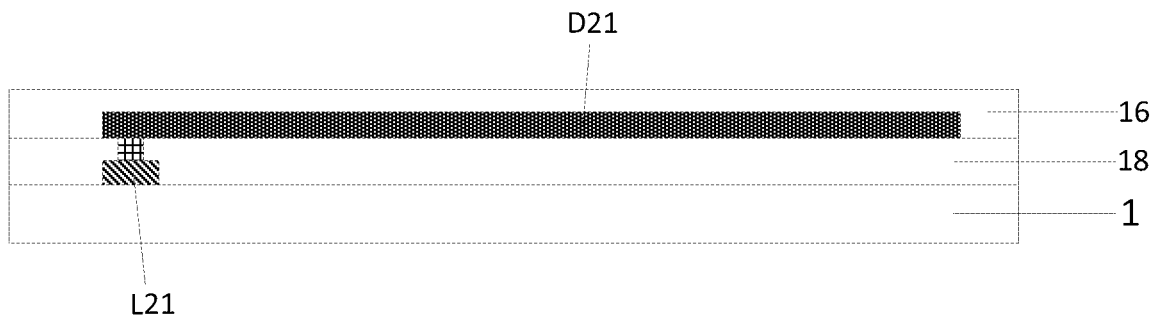
FIG. 14 is another schematic partial diagram of film layers of FIG. 9.

During particular implementation, according to the liquid crystal grating provided in the embodiments of the present disclosure, as shown in FIGS. 9, 13 and 14. FIGS. 13 and 14 are schematic partial diagrams of the film layers of FIG. 9, the liquid crystal grating further includes a gate insulating layer 18 located between the first gates 13 and the first active layers 17, the first signal lead L11 is electrically connected to the first signal input line D11 through a via hole penetrating the gate insulating layer 18, and the second signal lead L21 is electrically connected to the second signal input line D21 through a via hole penetrating the gate insulating layer 18.

During particular implementation, in order to unify the manufacturing process, as shown in FIGS. 9-11, all the drive transistors TFT1 and the TFT2 may be N-type transistors. Certainly all the drive transistors TFT1 and TFT2 may also be P-type transistors.

Figure 15:
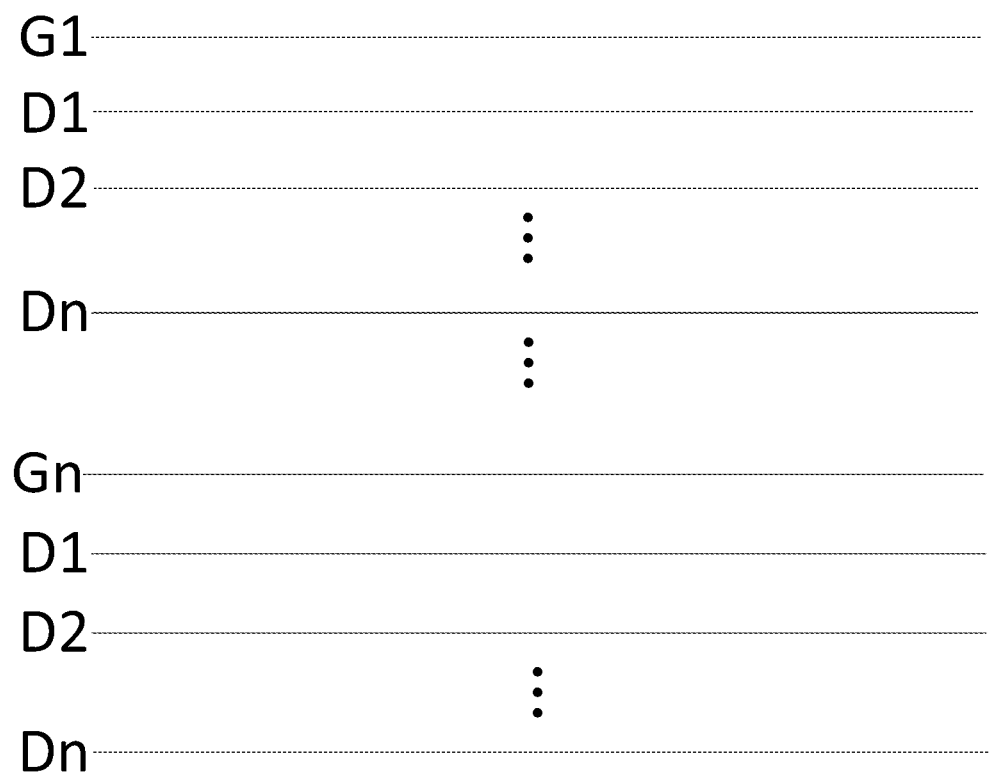
FIG. 15 shows a working principle of a liquid crystal grating during 2D display.
Figure 16:
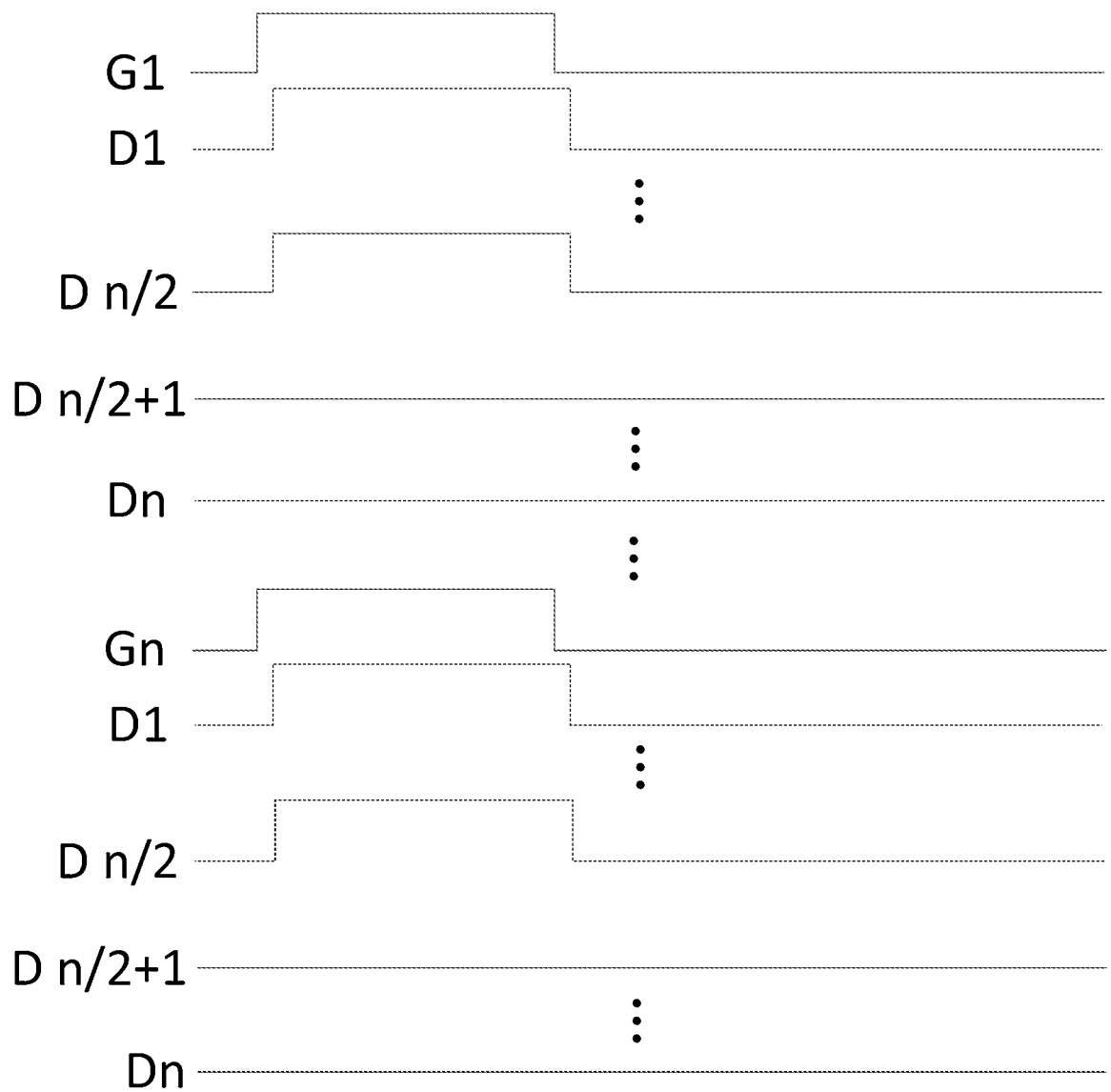
FIG. 16 shows a working principle of a liquid crystal grating during 3D display.

Taking all the drive transistors TFT1 and TFT2 being N-type transistors as an example, a working principle of the TN-type liquid crystal grating provided in the embodiments of the present disclosure is described below: A timing sequence is as shown in FIGS. 15 and 16. The GOAL and the GOA2 work simultaneously, the GOAL opens from G11 to Gln row by row, and the GOA2 opens from G11' to Gln row by row. The G line numbered the same and electrically connected to the GOAL and the GOA2 control a D signal of the same row: Since the timing sequences of the GOAL and the GOA2 are the same. FIGS. 15 and 16 only show a working timing sequence of the GOAL, and G11 to Gln are represented by G1 to Gn and D11 to Din are represented by DI to Dn.

Under the condition of a 2D display mode (corresponding to the time sequence in FIG. 15), a low-level signal is input into all the control lines G (that is, de-energization), all the drive transistors TFT are turned off, and the TN-type liquid crystal grating is in a normally-white mode (to reduce power consumption). That is, no drive signal is applied to the first transparent grating electrode layer 4 and the second transparent grating electrode layer 6, the liquid crystal molecules in the liquid crystal layer 3 are not deflected, a polarization direction of the linearly polarized light is rotated by 90° after the linearly polarized light passes through the liquid crystal layer 3, and the linearly polarized light may pass through the second polarizer 12, such that the region where the liquid crystal is not deflected corresponds to a light-transmitting region. In this case, the TN-type liquid crystal grating is in a full transmission mode (the entire liquid crystal grating forms light-transmitting regions) and has a maximum transmission rate.

Under the condition of a 3D display mode (corresponding to the time sequence in FIG. 16), a low-level signal is input into the gates of the drive transistors TFT1 and the TFT2 electrically connected to the first strip-shaped sub-electrode 411 and the second strip-shaped sub-electrode 611 corresponding to the positions of the grating slits through corresponding control lines, to close the gates and enter a light-transmitting mode, that is, a light-transmitting region is formed. A high-level signal is input into the gates of the drive transistors TFT1 and the TFT2 electrically connected to the first strip-shaped sub-electrodes 411 and the second strip-shaped sub-electrode 611 at the remaining positions through corresponding control lines to be conducted, a drive voltage is applied to corresponding signal input lines D through the first signal leads and the second signal leads, and the drive voltage is transmitted to the first strip-shaped sub-electrodes 411 and the second strip-shaped sub-electrodes 611 through the conducted drive transistors TFT1 and TFT2, to enter a shading mode, that is, a dark-state region is formed. Therefore, the liquid crystal grating forms light-transmitting regions and dark-state regions arranged alternatively. Since the first strip-shaped sub-electrodes 411 and the second strip-shaped sub-electrodes 611 are periodically controlled by several D lines, an equally-spaced slit grating is presented.

In view of the above, according to the liquid crystal grating provided in the embodiments of the present disclosure, each strip-shaped sub-electrode is separately charged and discharged through the TFT to achieve on-off, and the slit and position of the grating are precisely controlled in combination with the human eye tracking module, such that a motion parallax due to the movement of the viewer in the 3D display may be achieved, moiré patterns and view crosstalk caused by a viewing position change may further be eliminated.

Figure 17:
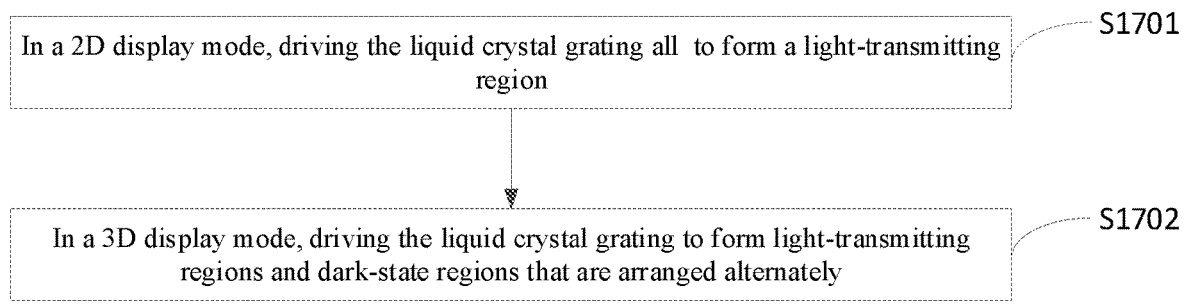
FIG. 17 is a schematic flowchart of a driving method for a liquid crystal grating according to an embodiment of the present disclosure.

Based on the same inventive concept, embodiments of the present disclosure further provide a driving method for the liquid crystal grating. As shown in FIG. 17, the driving method includes the following:

S1701, in a 2D display mode, driving the liquid crystal grating all to form a light-transmitting region; and S1702, in a 3D display mode, driving the liquid crystal grating to form light-transmitting regions and dark-state regions that are arranged alternately.

Reference may be made to principle description for 2D and 3D display in the foregoing liquid crystal grating for the principle description of the above driving method provided in the embodiments of the present disclosure, which will not be repeated herein.

Figure 18:
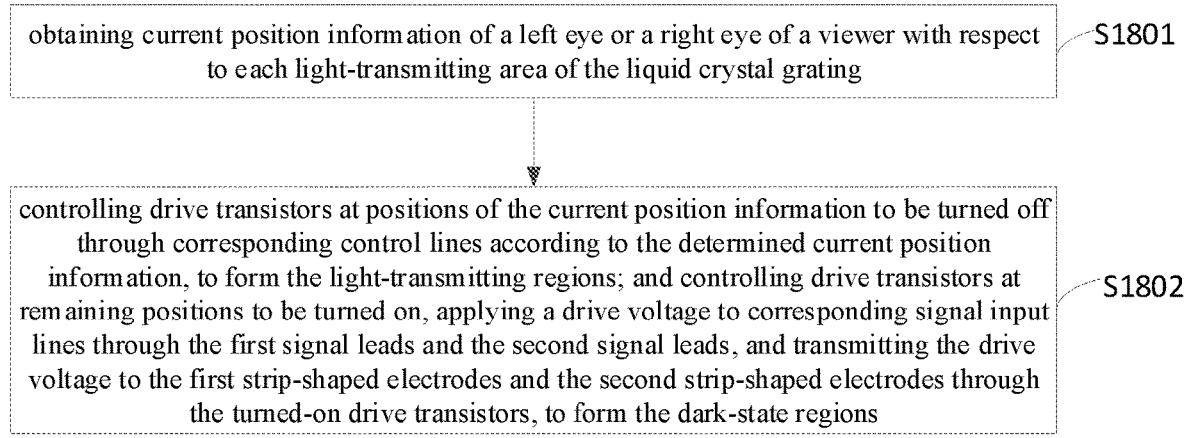
FIG. 18 is a schematic flowchart of another driving method for a liquid crystal grating according to an embodiment of the present disclosure.

During particular implementation, according to the driving method for the liquid crystal grating provided in the embodiments of the present disclosure, as shown in FIG. 18, in a 3D display mode, the step of driving the liquid crystal grating to form light-transmitting regions and dark-state regions that are arranged alternately may specifically include:

S1801, obtaining current position information of a left eye or a right eye of a viewer with respect to each light-transmitting area of the liquid crystal grating; and S1802, controlling drive transistors at positions of the current position information to be turned off through corresponding control lines according to the determined current position information, to form the light-transmitting regions; and controlling drive transistors at remaining positions to be turned on, applying a drive voltage to corresponding signal input lines through the first signal leads and the second signal leads, and transmitting the drive voltage to the first strip-shaped electrodes and the second strip-shaped electrodes through the turned-on drive transistors, to form the dark-state regions.

Specifically, in the above 3D display mode, the liquid crystal grating is driven to form light-transmitting regions and dark-state regions that are arranged alternately, and reference may be made to the particular principle description of 3D display in the foregoing liquid crystal grating, which will not be repeated herein.

Figure 19:
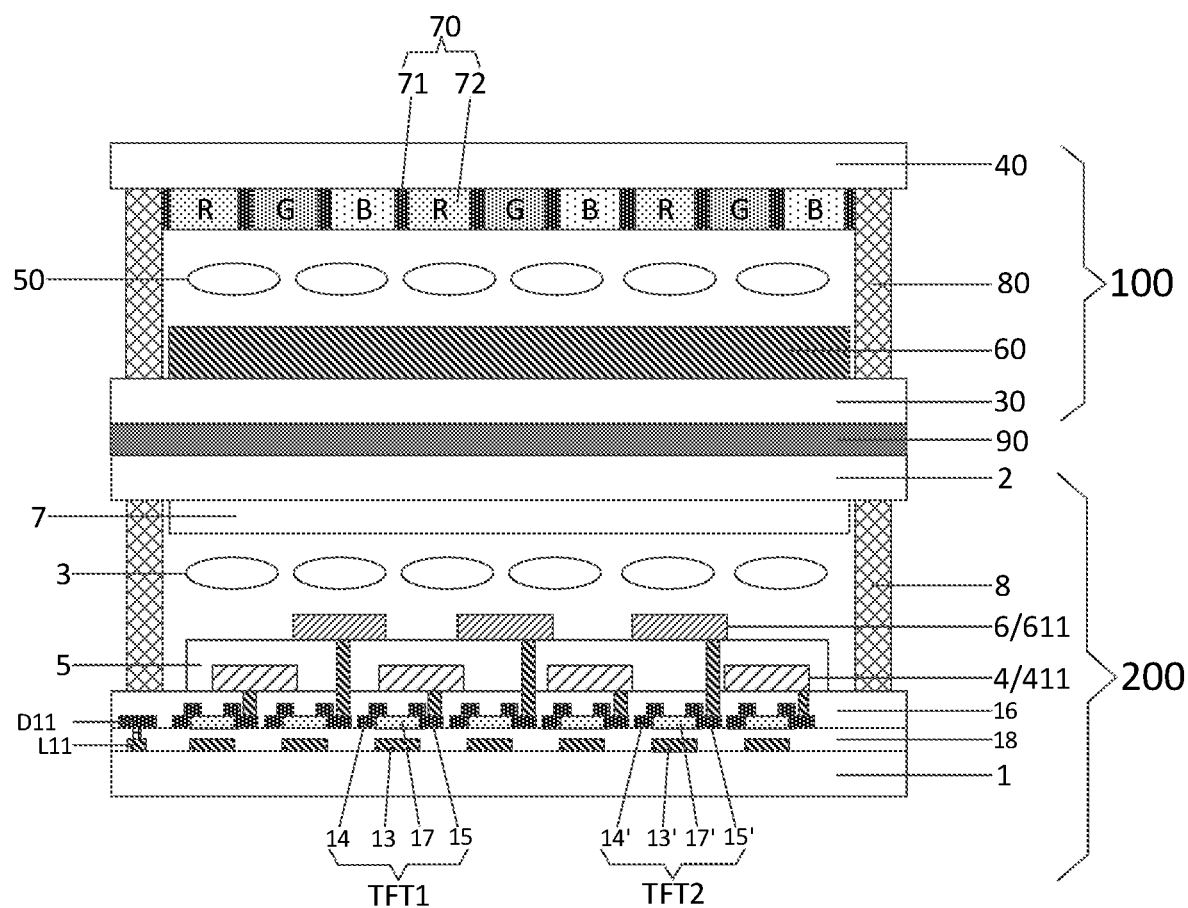
FIG. 19 is a schematic structural diagram of a 3D display device according to an embodiment of the present disclosure.

Based on the same inventive concept, embodiments of the present disclosure further provide a 3D display device. As shown in FIG. 19, the 3D display device includes a display panel 100, the liquid crystal grating 200 provided by the embodiments of the present disclosure, and a human eye tracking module (not shown):

where the human eye tracking module is configured to obtain positions where eyes of a viewer are located;

according to the current positions, where the eyes of the viewer are located, obtained by the human eye tracking module, the liquid crystal grating 200 is controlled to form the light-transmitting regions and the dark-state regions that are arranged alternately, so that the left eye of the viewer sees a left-eye image displayed in the display panel 100 through the light-transmitting regions of the liquid crystal grating 200, and the right eye sees a right-eye image displayed in the display panel 100 through the light-transmitting regions.

During particular implementation, according to the 3D display device provided in the embodiments of the present disclosure, as shown in FIG. 19, the display panel 100 may be a liquid crystal display panel, and the liquid crystal grating 200 is arranged at a light incident side of the liquid crystal display panel (100). The liquid crystal display panel (100) may include: a third substrate 30 and a fourth substrate 40 arranged opposite each other: a liquid crystal layer 50) located between the third substrate 30 and the fourth substrate 40; an array substrate 60 located at one side, facing the liquid crystal layer 50, of the third substrate 30; a color film substrate 70 located at one side, facing the liquid crystal layer 50, of the fourth substrate 40); and a sealant layer 80 located between the third substrate 30 and the fourth substrate 40 and located around the liquid crystal display panel. The color film substrate 70 includes black matrices 71 and a color film layer 72 (for example, a red film R, a green film G. and a blue film B), the black matrices 71 have a plurality of openings, and the color film layer 72 is located in the openings of the black matrices 71.

As shown in FIG. 19, the liquid crystal display panel (100) and the liquid crystal grating 200 are attached together through intermediate glass 90, and attaching alignment marks are arranged on the array substrate 60 and the second substrate 2 separately. A thickness of the glass 90 is equal to the placement height H of the liquid crystal grating 200.

According to the 3D display device provided in embodiments of the present disclosure, by arranging the liquid crystal grating 200 at the light incident side of the liquid crystal display panel (100), when the liquid crystal display panel (100) includes a touch control electrode, the liquid crystal grating 200 may not shield the touch control electrode in the liquid crystal display panel (100), to avoid the problem of touch failure, and further improve touch sensitivity and accuracy of the liquid crystal display panel (100).

During particular implementation, the display panel provided in the embodiments of the present disclosure is not limited to a liquid crystal display panel. For example, the display panel provided in the embodiments of the present disclosure may be an OLED display panel, and the liquid crystal grating is arranged at a light emitting side of the OLED display panel.

During particular implementation, the 3D display device provided in the embodiments of the present disclosure may further include other function film layers well known to those skilled in the art according to the type of the display panel, which are not enumerated herein.

The 3D display device may be any product or part with a display function, for example, a mobile phone, a tablet personal computer, a television, a display, a notebook computer, a digital photo frame, a navigator, etc. The principle for solving problems of the 3D display device is similar to that of the foregoing liquid crystal grating. Therefore, reference may be made to the implementation of the foregoing liquid crystal grating for the implementation of the 3D display device, which will not be repeated herein.

According to the liquid crystal grating and the driving method therefor, and the 3D display device provided in the embodiments of the present disclosure, when the liquid crystal grating is applied to the 3D display device, by applying a drive voltage to part of the first strip-shaped electrodes in the first transparent grating electrode layer and applying no drive voltage to part of the first strip-shaped electrodes, the liquid crystal grating may be driven to form light-transmitting regions and dark-state regions that are arranged alternately, such that a left eye of a viewer may see a left-eye image displayed in a display panel through the light-transmitting regions of the liquid crystal grating, and a right eye may see a right-eye image displayed in the display panel through the light-transmitting regions, so as to achieve naked-eye 3D display. By dividing each of at least part of the first strip-shaped electrodes in the first direction into at least two first strip-shaped sub-electrodes arranged independently, a resistance of each first strip-shaped electrode divided into at least two first strip-shaped sub-electrodes arranged independently may be reduced, to reduce signal attenuation and delay, so as to improve a performance of the liquid crystal grating.

While the preferred embodiments of the present disclosure have been described, additional alterations and modifications to those embodiments can be made by those skilled in the art once the basic inventive concept is apparent to those skilled in the art. Therefore, it is intended that the appended claims are to be interpreted to include the preferred embodiments and all alterations and modifications that fall within the scope of the present disclosure.

It will be apparent to those skilled in the art that various modifications and variations can be made to the embodiments of the present disclosure without departing from the spirit and scope of the embodiments of the present disclosure. In this way, if the amendments and variations to the embodiments of the present disclosure fall within the scope of claims of the present disclosure and the equivalents thereof, it is intended that the present disclosure also includes these amendments and variations.

What is claimed is:

1. A liquid crystal grating, comprises:
   a first substrate;
   a second substrate, wherein the second substrate and the first substrate are oppositely arranged;
   a liquid crystal layer, wherein the liquid crystal layer is located between the first substrate and the second substrate; and
   a first transparent grating electrode layer located at a side, facing the liquid crystal layer, of the first substrate; wherein the first transparent grating electrode layer comprises a plurality of first strip-shaped electrodes extending in a first direction and arranged at intervals in a second direction, and
   each of at least part of the plurality of first strip-shaped electrodes is divided in the first direction into at least two first strip-shaped sub-electrodes arranged independently;
   wherein the liquid crystal grating further comprises: an insulating layer located at a side, facing the liquid crystal layer, of the first transparent grating electrode layer; and a second transparent grating electrode layer located at a side, facing the liquid crystal layer, of the insulating layer;
   wherein the second transparent grating electrode layer comprises a plurality of second strip-shaped electrodes extending in the first direction and arranged at intervals in the second direction; orthographic projections of the plurality of second strip-shaped electrodes on the first substrate cover an orthographic projection of a region between two first adjacent strip-shaped electrodes on the first substrate; and each of at least part of the plurality of second strip-shaped electrodes is divided in the first direction into at least two second strip-shaped sub-electrodes arranged independently;
   wherein the liquid crystal grating comprises a grating region and a peripheral region arranged around the grating region;
   wherein the grating region comprises: a plurality of control lines extending in the first direction and arranged in the second direction; a plurality of signal input lines extending in the second direction and arranged in the first direction; and a plurality of drive transistors located between the first substrate and the first transparent grating electrode layer;
   wherein the plurality of drive transistors are in one-to-one correspondence with the first strip-shaped sub-electrodes and the second strip-shaped sub-electrodes;
   the plurality of control lines are arranged on a same layer as gates of the plurality of drive transistors, and the plurality of signal input lines are arranged on a same layer as sources and drains of the plurality of drive transistors; and
   the gates of the plurality of drive transistors are electrically connected to the plurality of control lines, the sources of the plurality of drive transistors are electrically connected to the plurality of signal input lines, and the drains of the plurality of drive transistors are electrically connected to the first strip-shaped sub-electrodes or the second strip-shaped sub-electrodes.

2. The liquid crystal grating according to claim 1, wherein each of the plurality of first strip-shaped electrodes is divided in the first direction into at least two first strip-shaped sub-electrodes arranged independently.

3. The liquid crystal grating according to claim 1, wherein each of the plurality of second strip-shaped electrodes is divided in the first direction into at least two second strip-shaped sub-electrodes arranged independently.

4. The liquid crystal grating according to claim 3, wherein a quantity of the second strip-shaped sub-electrodes of each of the plurality of second strip-shaped electrodes is equal to that of the first strip-shaped sub-electrodes of each of the plurality of first strip-shaped electrodes.

5. The liquid crystal grating according to claim 3, wherein the first strip-shaped sub-electrodes of the plurality of first strip-shaped electrodes have a same length in the first direction, and the second strip-shaped sub-electrodes of the plurality of second strip-shaped electrodes have a same length in the first direction.

6. The liquid crystal grating according to claim 1, wherein the plurality of control lines comprise first control lines and second control lines, the plurality of signal input lines comprise first signal input lines and second signal input lines, and the plurality of drive transistors comprise first drive transistors and second drive transistors;

gates of the first drive transistors are electrically connected to the first control lines, sources of the first drive transistors are electrically connected to the first signal input lines, and drains of the first drive transistors are electrically connected to the first strip-shaped sub-electrodes; and gates of the second drive transistors are electrically connected to the second control lines, sources of the second drive transistors are electrically connected to the second signal input lines, and drains of the second drive transistors are electrically connected to the second strip-shaped sub-electrodes.

7. The liquid crystal grating according to claim 6, wherein gates of first drive transistors electrically connected to a same first strip-shaped electrode are electrically connected to a same first control line; and one first control line is electrically connected to gates of first drive transistors electrically connected to at least one first strip-shaped electrode.

8. The liquid crystal grating according to claim 7, wherein gates of second drive transistors electrically connected to a same second strip-shaped electrode are electrically connected to a same second control line; and one second control line is electrically connected to gates of second drive transistors electrically connected to at least one second strip-shaped electrode.

9. The liquid crystal grating according to claim 6, wherein the peripheral region comprises a plurality of first signal leads and a plurality of second signal leads;

sources of first drive transistors electrically connected to a same first strip-shaped electrode are electrically connected to a same first signal lead through corresponding first signal input lines, and sources of first drive transistors electrically connected to different first strip-shaped electrodes are electrically connected to different first signal leads through corresponding first signal input lines; and sources of second drive transistors electrically connected to a same second strip-shaped electrode are electrically connected to a same second signal lead through corresponding second signal input lines, and sources of second drive transistors electrically connected to different second strip-shaped electrodes are electrically connected to different second signal leads through corresponding second signal input lines.

10. The liquid crystal grating according to claim 6, wherein the peripheral region comprises a plurality of first signal leads and a plurality of second signal leads;

sources of first drive transistors electrically connected to first strip-shaped sub-electrodes of a same first strip-shaped electrode are electrically connected to different first signal leads through corresponding first signal input lines, and sources of first drive transistors electrically connected to different first strip-shaped electrodes are electrically connected to different first signal leads through corresponding first signal input lines; and sources of second drive transistors electrically connected to second strip-shaped sub-electrodes of a same second strip-shaped electrode are electrically connected to different second signal leads through corresponding second signal input lines, and sources of second drive transistors electrically connected to different second strip-shaped electrodes are electrically connected to different second signal leads through corresponding second signal input lines.

11. The liquid crystal grating according to claim 9, wherein the grating region is divided into at least one region; and for each of the at least one region, the plurality of first strip-shaped electrodes are divided into a plurality of first groups, a quantity of first strip-shaped electrodes in each of the first groups is same, and a quantity of the first signal leads is equal to that of the first strip-shaped electrodes in each of the first groups; the second strip-shaped electrodes are divided into a plurality of second groups, a quantity of second strip-shaped electrodes in each of the second groups is same, and a quantity of the second signal leads is equal to that of the second strip-shaped electrodes in each of the second groups;

in the plurality of first groups, first strip-shaped electrodes at a same position are electrically connected to a same first signal lead through a same first signal input line, and first strip-shaped electrodes at different positions are electrically connected to different first signal leads through different first signal input lines; and in the plurality of second groups, second strip-shaped electrodes at a same position are electrically connected to a same second signal lead through a same second signal input line, and second strip-shaped electrodes at different positions are electrically connected to different second signal leads through different second signal input lines.

12. The liquid crystal grating according to claim 9, further comprising a planarization layer located between the plurality of drive transistors and the first transparent grating electrode layer;

wherein each of the first drive transistors comprises a first gate, a first active layer, a first source and a first drain that are arranged in a stack manner; and the first strip-shaped sub-electrodes are electrically connected to the first drains through via holes penetrating the planarization layer;

each of the second drive transistors comprises a second gate, a second active layer, a second source and a second drain that are arranged in a stack manner; and the second strip-shaped sub-electrodes are electrically connected to the second drains through via holes penetrating the planarization layer and the insulating layer; and the first gate is arranged on a same layer as the second gate, the first active layer is arranged on a same layer as the second active layer, and the first source and the first drain are arranged on a same layer as the second source and the second drain.

13. The liquid crystal grating according to claim 12, wherein the first signal leads are arranged on the same layer as the first gate, and the second signal leads are arranged on the same layer as the second gate.

14. The liquid crystal grating according to claim 13, further comprising a gate insulating layer located between the first gate and the first active layer;

wherein the first signal lead is electrically connected to the first signal input line through a via hole penetrating the gate insulating layer, and the second signal lead is electrically connected to the second signal input line through a via hole penetrating the gate insulating layer.

15. The liquid crystal grating according to claim 1, further comprising a common electrode layer at a side, facing the liquid crystal layer, of the second substrate;

wherein the common electrode layer is a planar structure arranged as an entire surface.

16. A driving method for the liquid crystal grating according to claim 1, comprising:
in a two-dimensional (2D) display mode, driving the liquid crystal grating all to form a light-transmitting region; and
in a three-dimensional (3D) display mode, driving the liquid crystal grating to form light-transmitting regions and dark-state regions that are arranged alternately.

17. The driving method for the liquid crystal grating according to claim 16, wherein in the 3D display mode, the driving the liquid crystal grating to form the light-transmitting regions and the dark-state regions that are arranged alternately specifically comprises:
obtaining current position information of a left eye or a right eye of a viewer with respect to each light-transmitting area of the liquid crystal grating; and
controlling drive transistors at positions of the current position information to be turned off through corresponding control lines according to the obtained current position information, to form the light-transmitting regions; and controlling drive transistors at remaining positions to be turned on, applying a drive voltage to corresponding signal input lines through first signal leads and second signal leads, and transmitting the drive voltage to the first strip-shaped electrodes and the second strip-shaped electrodes through the turned-on drive transistors, to form the dark-state regions.

18. A three-dimensional (3D) display device, comprising a display panel, the liquid crystal grating according to claim 1, and a human eye tracking module;
wherein the human eye tracking module is configured to obtain positions where eyes of a viewer are located; and
according to current positions, where the eyes of the viewer are located, obtained by the human eye tracking module, the liquid crystal grating is controlled to form light-transmitting regions and dark-state regions that are arranged alternately, so that a left eye of the viewer sees a left-eye image displayed in the display panel through the light-transmitting regions of the liquid crystal grating, and a right eye sees a right-eye image displayed in the display panel through the light-transmitting regions;
wherein the display panel is a liquid crystal display panel, and the liquid crystal grating is arranged at a light incident side of the liquid crystal display panel; or
the display panel is an organic light emitting diode (OLED) display panel, and the liquid crystal grating is arranged at a light emitting side of the OLED display panel.

* * * * *